(12) United States Patent
Kawabata et al.

(10) Patent No.: US 7,951,082 B2
(45) Date of Patent: May 31, 2011

(54) ULTRASONIC DIAGNOSTIC APPARATUS AND TOMOGRAPHIC IMAGE PROCESSING APPARATUS

(75) Inventors: Akihiro Kawabata, Daito (JP); Manabu Migita, Neyagawa (JP)

(73) Assignee: Panasonic Corporation, Osaka (JP)

( * ) Notice: Subject to any disclaimer, the term of this patent is extended or adjusted under 35 U.S.C. 154(b) by 1237 days.

(21) Appl. No.: 10/885,704

(22) Filed: Jul. 8, 2004

(65) Prior Publication Data

US 2005/0033176 A1    Feb. 10, 2005

(30) Foreign Application Priority Data

Jul. 9, 2003   (JP) .................................. 2003-272595

(51) Int. Cl.
   *A61B 8/00*   (2006.01)
(52) U.S. Cl. ...................................................... 600/437
(58) Field of Classification Search .................. 600/447, 600/437, 443, 441, 407
   See application file for complete search history.

(56) References Cited

U.S. PATENT DOCUMENTS

| | | | |
|---|---|---|---|
| 5,383,461 A | | 1/1995 | Aoki et al. |
| 5,623,928 A | * | 4/1997 | Wright et al. ................. 600/447 |
| 5,795,297 A | | 8/1998 | Daigle |
| 5,910,116 A | | 6/1999 | Ishii |

FOREIGN PATENT DOCUMENTS

| | | |
|---|---|---|
| JP | 62-179438 | 8/1987 |
| JP | 2-261439 | 10/1990 |
| JP | 5-137716 | 6/1993 |
| JP | 9-75350 | 3/1997 |
| JP | 11-000329 | 1/1999 |
| JP | 11-206769 | 8/1999 |
| JP | 2002 238890 | 12/2002 |
| JP | 2003 299653 | 12/2003 |

* cited by examiner

*Primary Examiner* — Tse Chen
*Assistant Examiner* — Elmer Chao
(74) *Attorney, Agent, or Firm* — Wenderoth, Lind & Ponack L.L.P.

(57) ABSTRACT

A two-dimensional drawing module (25) (i) periodically reads acoustic line data (S401), (ii) checks a scanning method of a physical structure of a probe and acoustic line data, and (iii) selects the optimum coordinate conversion algorithm (S402). After that, the two-dimensional drawing module (25) (i) selects an interpolation algorithm, based on a display rate (S403), (ii) generates display data by performing a two-dimensional DSC process using the selected coordinate conversion algorithm and the like (S404*a*, 404*b* or 404*c*), (iii) performs a persistence process for the display data (S405), a frame interpolating process for a "B mode" image data (S406) and a display color conversion process (S407), and (iv) transmits the display data after such processes as described above to the display unit (14) (S408).

8 Claims, 11 Drawing Sheets

US 7,951,082 B2

ULTRASONIC DIAGNOSTIC APPARATUS AND TOMOGRAPHIC IMAGE PROCESSING APPARATUS

BACKGROUND OF THE INVENTION (1) Field of the Invention

The present invention relates to a signal processing technology for echo signals acquired via a probe of an ultrasonic diagnostic apparatus, in particular, to a data processing technology for acoustic line data generated based on the echo signals, and a data conversion technology from acoustic line data to display data.

(2) Description of the Related Art

An ultrasonic diagnostic apparatus which is capable of observing a subject without invasion and in real time has become an essential existence in the medical field. Recently, while there have been increasing attempts to improve the function of an ultrasonic diagnostic apparatus, there have been efforts to reduce the cost for operating the apparatus, as well.

As an example of such efforts to reduce the cost as described above, an ultrasonic diagnostic apparatus which performs a signal processing unit for generating acoustic line data in a software achieved by a personal computer is suggested (for example, refer to Japanese Laid-Open Patent publication No. H11-329).

FIG. 1 is a block diagram showing a functional structure of a conventional ultrasonic diagnostic apparatus 100. As shown in FIG. 1, the ultrasonic diagnostic apparatus 100 comprises: an overall control unit 71, a signal processing unit 72, an acoustic line data control unit 73, an acoustic line data memory unit 74, a two-dimensional display control unit 75, a display unit 76, a three-dimensional display control unit 77 and a three-dimensional data memory unit 78.

The overall control unit 71 is a functional unit that controls the overall operations of the ultrasonic diagnostic apparatus 100, such as a micro computer equipped with ROM or RAM.

The signal processing unit 72 performs a phasing addition and a filter process for echo signals received via a probe, and generates acoustic line data which indicates tomographic image information.

The acoustic line data control unit 73 controls writing-in and reading-out of the acoustic line data, generated by the signal processing unit 72, into the acoustic line data memory unit 74. And, the acoustic line data control unit 73 transmits the generated acoustic line data to the two-dimensional display control unit 75.

The acoustic line data memory unit 74 is a memory apparatus that memorizes acoustic line data following the direction of the acoustic line data control unit 73, such as RAM.

The two-dimensional display control unit 75 receives acoustic line data transmitted from the acoustic line data control unit 73, and performs a two-dimensional coordinate conversion process and an interpolating process for the acoustic line data. And, the two-dimensional display control unit 75 generates display data. And, the two-dimensional display control unit 75 transmits the display data to the display unit 76 and the three-dimensional display control unit 77.

The display unit 76 displays a tomographic image and the like in a monitor (for example, CRT: not shown in figures), based on the display data outputted by the two-dimensional display control unit 75 or the three-dimensional display control unit 77.

The three-dimensional display control unit 77 takes in the display data transmitted by the two-dimensional display control unit 75, and generates volume data and image (written as a "three-dimensional image" below) data that describes volume data.

The three-dimensional data memory unit 78 is, for example, RAM, and memorizes the volume data generated by the three-dimensional display control unit 77.

Next, the operations performed by the ultrasonic diagnostic apparatus 100 will be explained by classifying each representative operational mode. Each operational mode will be further divided into the two modes: a "live mode" and a "cine mode". Here, a "live mode" means a mode that generates acoustic line data from echo signals received via a probe (and further holds the generated acoustic line data in the acoustic line data memory unit 74), and displays a tomographic image and the like in real time. A "cine mode" means a mode that reads out the acoustic line data, once held in such "live mode" as described above, from the acoustic line data memory unit 74 and displays the tomographic image and the like.

(B Mode)

A "B mode" is a mode that displays the strength of a reflective wave with brightness.

A "live mode" of the "B mode" is a mode that processes echo signals received via a probe, and displays a "B mode" image in the display unit 76 in real time.

The operations performed by the "live mode" of the "B mode" are as following.

Acoustic line data indicating tomographic image information is generated by performing a phasing addition and a filter process for echo signals received via a probe in the signal processing unit 72. The generated acoustic line data is memorized by the acoustic line data memory unit 74, via the acoustic line data control unit 73; and at the same time, the generated acoustic line data is transmitted to the two-dimensional display control unit 75.

The two-dimensional display control unit 75 (i) performs a two-dimensional coordinate conversion process and an interpolating process for acoustic line data, (ii) generates display data for displaying a "B mode" image, and (iii) transmits the display data to the display unit 76. The display unit 76 displays the "B mode" image, based on the display data received from the two-dimensional display control unit 75.

On the other hand, the "cine mode" of the "B mode" reads out the acoustic line data memorized in the "live mode", and displays the "B mode" image in the display unit 76, as well as such "live mode" as described above.

The operations performed by the "cine mode" of the "B mode" are as following.

The acoustic line data control unit 73 reads out the acoustic line data memorized by the acoustic line data memory unit 74, and transmits the acoustic line data to the two-dimensional display control unit 75. Here, the operations of the two-dimensional display control unit 75 and the display unit 76 are the same as those of the "live mode" of the "B mode".

(Color Mode)

A "color mode" is a mode that displays a blood flow image (a tomographic image indicating the high and low of the blood flow speed with a plurality of colors, which is also called a "color flow mode"). The "live mode" of the "color mode" processes echo signals received from a probe, and generates a blood flow image (also called the "color mode" image), and displays the blood flow image in the display unit 76 in real time.

The operations performed by the "live mode" of the "color mode" are as following.

The signal processing unit 72 performs a phasing addition, a filter process, and a frequency analysis process for echo signals received via a probe, and generates acoustic line data indicating blood flow information. The generated acoustic line data is memorized by the acoustic line data memory unit 74, via the acoustic line data control unit 73; and at the same time, the generated acoustic line data is transmitted to the two-dimensional display control unit 75.

The two-dimensional display control unit 75 performs a two-dimensional coordinate conversion process and an interpolating process for acoustic line data, generates display data for displaying a "color mode" image, and transmits the display data to the display unit 76.

On the other hand, the "cine mode" of the "color mode" reads out the acoustic line data memorized by the "live mode", and displays the "color mode" image in the display unit 76, based on the generated display data, as well as such "live mode" as described above.

The operations performed by the "cine mode" of the "color mode" are as following.

The acoustic line data control unit 73 reads out the acoustic line data memorized by the acoustic line data memory unit 74, and transmits the acoustic line data to the two-dimensional display control unit 75. Here, the operations of the two-dimensional display control unit 75 and the display unit 76 are the same as those of the "live mode".

Also, in the operations performed by the "color mode", the operations of the "B mode" are concurrently performed; and in general, the "color mode" image is displayed overlapping the "B mode" image.

(M Mode)

An "M mode" is a mode that displays a time displacement image of tomographic image information in the same acoustic line position in the display unit 76.

The "live mode" of the "M mode" processes echo signals received via a probe to generate an "M mode" image, and displays the "M mode" image in the display unit 76 in real time.

The operations performed by the "live mode" of the "M mode" are as following.

First, the signal processing unit 72 performs a phasing addition and a filter process for echo signals received via a probe, and generates acoustic line data.

Next, the generated acoustic line data is memorized by the acoustic line data memory unit 74, via the acoustic line data control unit 73; and at the same time, the generated acoustic line data is transmitted to the two-dimensional display control unit 75.

The two-dimensional display control unit 75 performs a two-dimensional coordinate conversion process and an interpolating process for acoustic line data, and generates display data for displaying an "M mode" image, that is, display data where ultrasonic acoustic line information of the same acoustic line position is arranged in the order of the time string. And, the two-dimensional display control unit 75 transmits the display data to the display unit 76. The display unit 76 displays the "M mode" image according to the received display data.

On the other hand, the "cine mode" of the "M mode" reads out the acoustic line data memorized by the "live mode", and generates display data. And, the "cine mode" of the "M mode" transmits the display data to the display unit 76. The display unit 76 displays the "M mode" image, based on the received display data.

The operations performed by the "cine mode" of the "M mode" are as following.

First, the acoustic line data control unit 73 reads out the acoustic line data memorized by the acoustic line data memory unit 74, and transmits the acoustic line data to the two-dimensional display control unit 75.

Here, the operations of the two-dimensional display control unit 75 and the display unit 76 are the same as those of the "live mode" of the "M mode".

(Color M Mode)

A "color M mode" is a mode that displays a time displacement image of blood flow information in the same acoustic line position. The "live mode" of the "color M mode" processes echo signals received via a probe, and displays the "color M mode" image in the display unit 76 in real time.

The operations performed by the "live mode" of the "color M mode" are as following.

First, the signal processing unit 72 performs a phasing addition, a filter process and a frequency analysis process for echo signals received via a probe, and generates acoustic line data indicating blood flow information.

Next, the generated acoustic line data is memorized by the acoustic line data memory unit 74, via the acoustic line data control unit 73; and at the same time, the generated acoustic line data is transmitted to the two-dimensional display control unit 75.

The two-dimensional display control unit 75 performs a two-dimensional coordinate conversion process and an interpolating process for acoustic line data, and generates display data for displaying a "color M mode" image, that is, display data where blood flow acoustic line information of the same acoustic line position is arranged in the order of the time string. And, the two-dimensional display control unit 75 transmits the display data to the display unit 76.

On the other hand, the "cine mode" of the "color M mode" reads out the acoustic line data memorized by the "live mode", and displays the "color M mode" image, based on the display data, in the display unit 76.

The operations performed by the "cine mode" of the "color M mode" are as following.

First, the acoustic line data control unit 73 reads out the acoustic line data indicating blood flow information memorized by the acoustic line data memory unit 74, and transmits the acoustic line data to the two-dimensional display control unit 75.

Here, the operations of the two-dimensional display control unit 75 and the display unit 76 are the same as those of the "live mode". Also, in the operations performed by the "color M mode", the operations of the "M mode" are concurrently performed; and in general, the "color M mode" image is displayed overlapping the "M mode" image.

(Doppler Mode)

A "Doppler mode" is a mode that displays a time displacement image of the Doppler spectrum of the same acoustic line position.

The "live mode" of the "Doppler mode" processes echo signals received via a probe, and displays the "Doppler mode" image in the display unit 76 in real time.

The operations performed by the "live mode" of the "Doppler mode" are as following.

First, the signal processing unit 72 performs a phasing addition, a filter process, and a Fourier analysis process for echo signals received via a probe, and generates acoustic line data indicating Doppler spectrum information.

Next, the generated acoustic line data is memorized by the acoustic line data memory unit 74, via the acoustic line data control unit 73; and at the same time, the generated acoustic line data is transmitted to the two-dimensional display control unit 75.

The two-dimensional display control unit 75 performs a two-dimensional coordinate conversion process and an interpolating process for acoustic line data, and generates display data for displaying a "Doppler mode" image, that is, display data where Doppler spectrum acoustic line information of the same acoustic line position is arranged in the order of the time string. And, the two-dimensional display control unit 75 transmits the display data to the display unit 76.

On the other hand, the "cine mode" of the "Doppler mode" generates the display data by reading out the acoustic line data memorized by the "live mode", and displays the "Doppler mode" image in the display unit 76.

The operations performed by the "cine mode" of the "Doppler mode" are as following.

First, the acoustic line data control unit 73 reads out the acoustic line data indicating Doppler spectrum information memorized by the acoustic line data memory unit 74, and transmits the acoustic line data to the two-dimensional display control unit 75. Here, the operations of the two-dimensional display control unit 75 and the display unit 76 are the same as those of the "live mode" of the "Doppler mode".

(3D Live Mode)

A "3D live mode" is a mode that simultaneously generates (a) a tomographic image by processing echo signals received via a 3D probe in real time, and (b) a three-dimensional image by a volume rendering process, said volume being generated from a plurality of tomographic image group which is a volume data set, and simultaneously displays a tomographic image and a three-dimensional image in the display unit 76.

The operations performed by the "3D live mode" are as following.

First, the signal processing unit 72 performs a phasing addition and a filter process for echo signals received via a probe, and generates acoustic line data. Next, the generated acoustic line data is transmitted to the two-dimensional display control unit 75, via the acoustic line data control unit 73.

The two-dimensional display control unit 75 performs a two-dimensional coordinate conversion process and an interpolating process for acoustic line data, and generates display data. And, the two-dimensional display control unit 75 transmits the display data to the display unit 76 and the three-dimensional display control unit 77.

The three-dimensional display control unit 77 takes in the display data, and generates volume data on the three-dimensional data memory unit 78. And, the three-dimensional display control unit 77 generates three-dimensional image data by a volume rendering, and transmits the three-dimensional image data to the display unit 76.

Finally, the display unit 76 simultaneously displays the tomographic image and the three-dimensional image data.

(Multi Planner Reconstruction (MPR) Mode)

An "MPR mode" is a display mode that observes volume data on the three-dimensional data memory unit 78 as a three-dimensional image or a cross-sectional image from an arbitrary viewpoint, said volume data being generated by the "3D live mode".

The operations performed by the "MPR mode" are as following.

First, by using the volume data on the three-dimensional memory unit 78 and according to the radial direction provided by the overall control unit 71, the three-dimensional display control unit 77 performs a volume rendering, and generates three-dimensional image data. And, the three-dimensional display control unit 77 transmits the three-dimensional image data to the display unit 76.

Next, by using the volume data memorized on the three-dimensional data memory unit 78, the three-dimensional display control unit 77 generates cross-sectional image data whose volume is sliced by a predetermined plate provided by the overall control unit 71, and transmits the cross-sectional image data to the display unit 76.

Finally, the display unit 76 performs a display, according to the three-dimensional image data and the cross-sectional image data.

Although specific explanations will be omitted here, the "MPR mode" is capable of an operation to delete a part of the volume data. In such case as described above, the "MPR mode" generates and displays the three-dimensional image and the cross-sectional image for the volume data other than the deleted part.

A structure of the conventional ultrasonic diagnostic apparatus can be briefly divided into the following two units: (i) a signal processing unit that generates acoustic line data by performing a phasing addition and a filter process for echo signals received via a probe, and (ii) a backend unit that memorizes the acoustic line data outputted from the signal processing unit and reads out the acoustic line data to display.

As shown in FIG. 1, the backend unit includes the following functional units: an acoustic line data control unit 73, an acoustic line data memory unit 74, a two-dimensional display control unit 75, a display unit 76, a three-dimensional display control unit 77 and a three-dimensional data memory unit 78.

The problems of the backend unit 79 of the conventional ultrasonic diagnostic apparatus 100 will be explained in detail as following.

The image quality of a two-dimensional tomographic image outputted by the ultrasonic diagnostic apparatus 100 is greatly influenced not only by the process algorithm of the signal processing unit but also by the process algorithm of the backend unit. In particular, the quality of the tomographic image and the like is greatly influenced by the interpolating process for a coordinate conversion, the frame interpolating process and the like which are necessary in the process of converting acoustic line data to display data.

For example, the two-dimensional display control unit 75 needs a coordinate conversion to the display area of the display unit 76, according to the physical form of the probe connected to the ultrasonic diagnostic apparatus; however, a convex probe or a sector probe and the like need a polar-orthogonal coordinate conversion. In such polar-orthogonal coordinate conversion, the acoustic line data which is original data does not appear on the grid of the orthogonal coordinate. Thus, it is necessary to generate the display data on the orthogonal coordinate by the interpolating process.

Although there are various kinds of interpolating methods for the interpolating process algorithm, such as a linear interpolating method and an upsampling filter method, each method has advantages and disadvantages.

In the case of the linear interpolating method, a calculation cost is not necessary, but the image quality is not very good. In the case of the upsampling filter method, the calculation cost increases, depending on the number of filter taps, but the image quality is improved than the linear interpolating method.

Thus, in order to achieve as good an image quality as possible by efficiently utilizing the hardware resource of the apparatus within the limit, the quality of the tomographic image should be optimized by enabling the dynamic change of the interpolating process algorithm, depending on the physical form of the probe and the frame rate of the tomographic image data outputted by the signal processing unit. However, according to the conventional structure, such functions as described above are performed as a functional block which performs a solid process. Thus, it is difficult to perform such processes as described above.

The quality of the three-dimensional image outputted by the ultrasonic diagnostic apparatus is greatly influenced by the process algorithm of the backend unit, as well as the quality of the two-dimensional tomographic image. The three-dimensional image generation process requires the two processes of a volume generation and rendering the generated volume. Such generation process and rendering process are performed by the three-dimensional display control unit 77.

Since the volume generation has the same problem as the one described in the quality of the two-dimensional tomographic image, the explanation will be omitted here.

As the volume rendering process performs the calculation process of a mass volume, the balance between the rendering algorithm which is related with the image quality and the processing time is always essential.

Another problem is the functional block division of the backend unit of the conventional ultrasonic diagnostic apparatus.

FIG. 2 is a diagram showing the further specific functional structures of the acoustic line data control unit 73 and the acoustic line data memory unit 74.

As shown in FIG. 2, an individual functional block is provided for each operational mode. The acoustic line data control unit 73 includes: the "B mode" acoustic line data control unit 73*a*, the "color mode" acoustic line data control unit 73*b*, the "M mode" acoustic line data control unit 73*c*, the "color M mode" acoustic line data control unit 73*d* and the "Doppler mode" acoustic line data control unit 73*e*. The acoustic line data memory unit 74 includes: the "B mode" acoustic line data memory unit 74*a*, the "color mode" acoustic line data memory unit 74*b*, the "M mode" acoustic line data memory unit 74*c*, the "color M mode" acoustic line data memory unit 74*d* and the "Doppler mode" acoustic line data memory unit 74*e*.

Here, in the case of the "B mode", only the "B mode" acoustic line data memory unit 74*a* is used among the blocks included in the acoustic line data memory unit 74; and the other blocks are not used.

Also, in the case of the "color mode", only the two blocks of the "B mode" acoustic line data memory unit 74*a* and the "color mode" acoustic line data memory unit 74*b* are used; and it is the same in the case of the other operational modes.

In addition, depending on the operational mode of the ultrasonic diagnostic apparatus, not only the use situation of the acoustic line data memory unit 74, but also the use situation of the three-dimensional data memory unit 78 differs. For example, in the case of displaying only the "B mode" image, the three-dimensional data memory unit 78 is not used at all.

Moreover, the coordinate conversions of the two-dimensional display control unit 75 and the three-dimensional display control unit 77 are essentially the same; however, at present they are performed as different functional blocks.

As described above, the functional block division of the backend unit of the conventional ultrasonic diagnostic apparatus is inefficient; and as a result, the cost is increased.

Japanese Laid-Open Patent publication No. H11-329 discloses an ultrasonic diagnostic apparatus which comprises a personal computer and a software that performs a signal process. And, the Japanese Laid-Open Patent publication No. H11-329 further discloses a fast performance of a signal process by the use of a CPU of a higher-efficiency, and a multiple process of a plurality of functional modules by implementing and multitask-operating the software in an object-oriented manner.

However, such problem as described above is not solved; and the advantage of the ultrasonic diagnostic apparatus comprising a software is not fully utilized.

SUMMARY OF THE INVENTION

An object of the present invention, in view of the above problem, is to provide the ultrasonic diagnostic apparatus which has an improved image quality and a flexible extendability, and to reduce the cost of the backend unit.

In order to achieve such object as described above the ultrasonic diagnostic apparatus according to the present invention comprises: an acoustic line data generation unit operable to generate acoustic line data, based on echo signals acquired via a probe, display data generation unit operable to generate display data for the generated acoustic line data, and a display unit operable to display an image describing an inner state of a subject, based on the generated display data, wherein the display data generation unit (i) changes the quality of the image describing the inner state of the subject, and (ii) generates display data after the change, according to the generation amount of the acoustic line data, per unit time, or the number of display frames of the image describing the inner state of the subject, per unit time.

Thus, it is possible to realize the function of the backend unit of the conventional ultrasonic diagnostic apparatus by efficiently utilizing the resource. Consequently, the cost of the apparatus can be reduced; and as high an image quality as the resource permits can be acquired.

Also, the operational mode of the present ultrasonic diagnostic apparatus has at least one of the following modes: a "B mode", a "color mode", an "M mode", a "color M mode", a "Doppler mode", a "3D live mode" and an "MPR mode".

In addition, in order to achieve such object as described above, the tomographic image processing apparatus according to the present invention comprises: an acoustic line data acquisition unit operable to acquire acoustic line data based on ultrasonic echo signals acquired via a probe; and a display data generation unit operable to generate display data for the acquired acoustic line data, wherein the display data generation unit (i) changes the quality of the image describing the inner state of the subject, according to the generation amount of the acoustic line data, per unit time, or the number of display frames of the image describing the inner state of the subject, per unit time, and (ii) generates display data after the change.

Thus, it is possible to realize the function of the backend unit of the conventional tomographic image processing apparatus by efficiently utilizing the resource. Consequently, the cost of the apparatus can be reduced; and as high an image quality as the resource permits can be acquired.

Moreover, the present invention can be realized as an ultrasonic diagnostic method or a tomographic image processing method which has steps of the characteristic functional structure of the ultrasonic diagnostic apparatus or the tomographic image processing apparatus and a program which includes all the steps of such methods as described above. And, needless to say, the program can be distributed via a record medium such as a CD-ROM and the like or a transmission medium such as the Internet and the like.

Thus, according to the present invention, depending on the generation amount, per unit time, of acoustic line data or the number of frames, per unit time, of an image describing the inner state of a subject which is displayed by the display step, the quality of an image describing the inner state of the subject can be changed; and by efficiently utilizing the resource, as high an image quality as the resource permits can be acquired.

Specifically, by flexibly changing (a) an interpolation algorithm of a two-dimensional DSC process, (b) the necessity or unnecessity of a frame persistence process, (c) the rate of a weighted addition of the process, (d) the necessity or unnecessity of a frame interpolation process and (e) the number of frames to generate in the process, a high image quality can be realized.

Furthermore, as for the image quality of a three-dimensional image as well, by flexibly changing (a) an interpolation algorithm of a three-dimensional DSC process, (b) a sample pitch of a volume rendering, (c) an interpolation algorithm, and (d) a rendering algorithm, a high image quality can be realized.

Finally, the functional block division of the backend unit of the ultrasonic diagnostic apparatus, as well as the two-dimensional DSC process and the three-dimensional DSC process, is performed by a host processor. Also, the acoustic line data control and the volume data control that differ, depending on the operational mode of the ultrasonic diagnostic apparatus are performed by the host processor and the main memory of the host processor, thus a system that is functionally simple and of a low cost can be built.

Consequently, the practical effects of the present invention are considered substantial.

FURTHER INFORMATION ABOUT TECHNICAL BACKGROUND TO THIS APPLICATION

The disclosure of Japanese Patent Application No. 2003-272595 filed on Jul. 9, 2003 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

The embodiments according to the present invention will be explained in detail with reference to the figures as following.

First Embodiment

Figure 1:
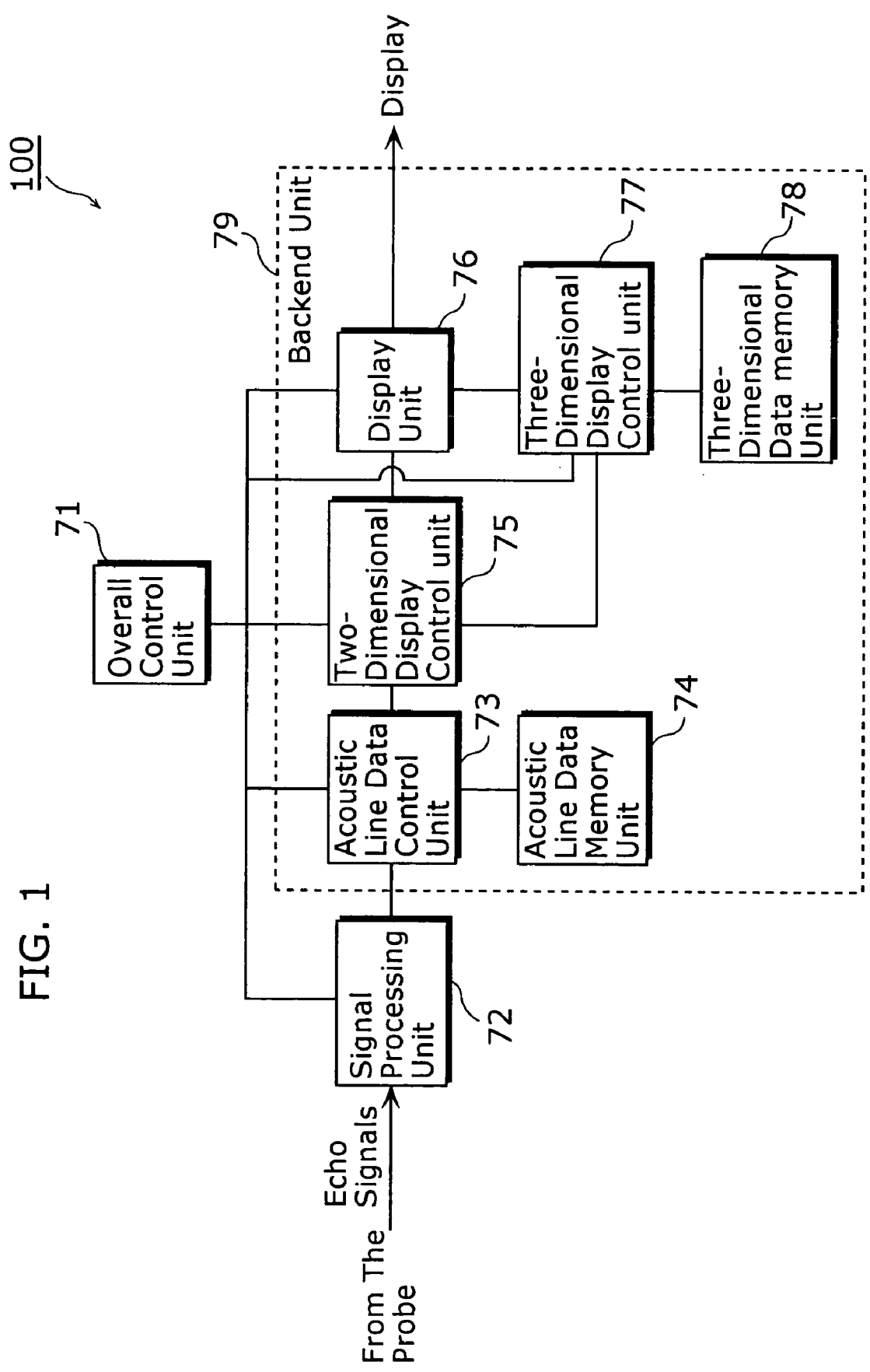
FIG. 1 is a block diagram showing a functional structure of the conventional ultrasonic diagnostic apparatus.
Figure 2:
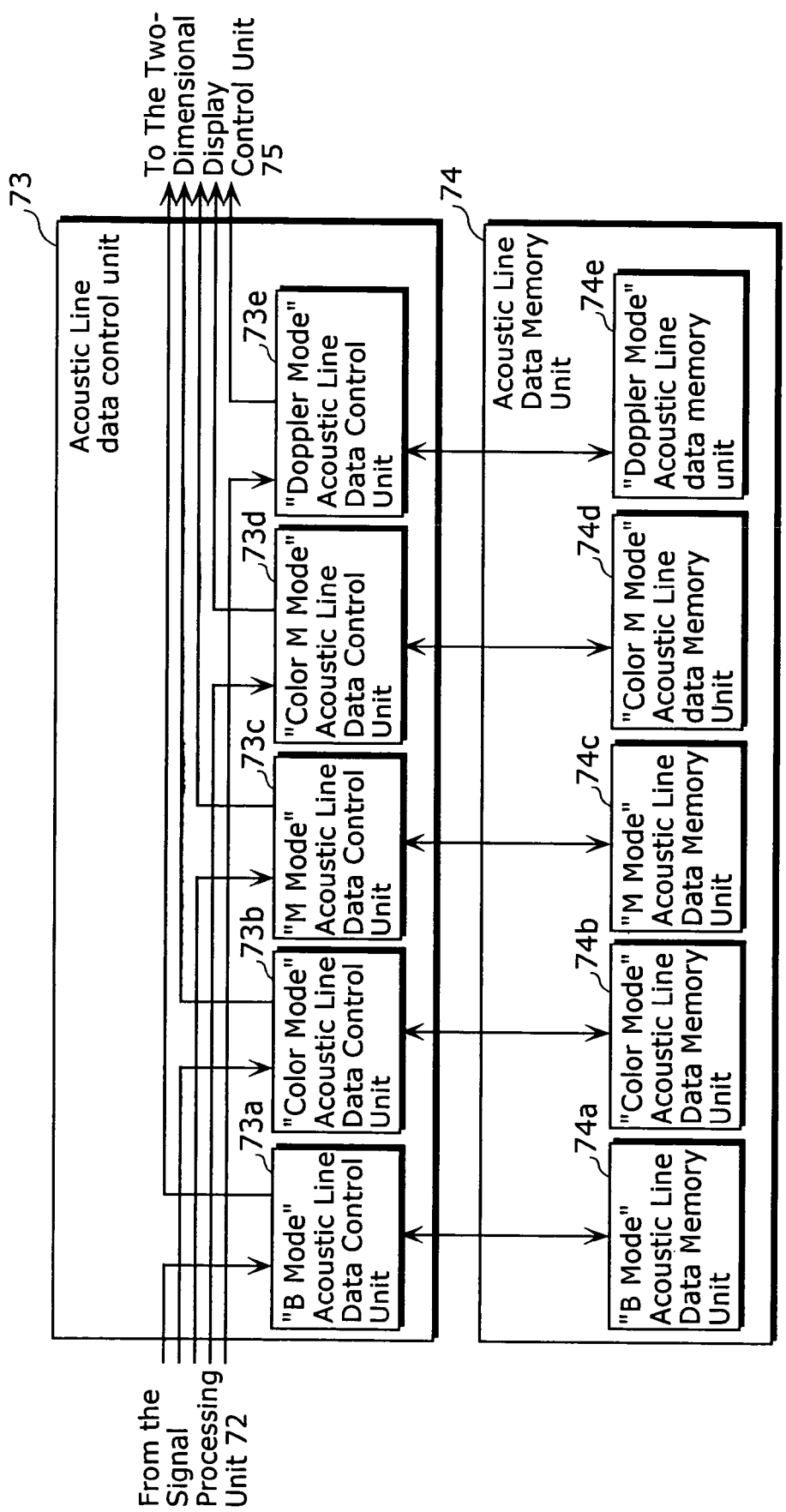
FIG. 2 is a functional structure diagram of the conventional acoustic line data control unit and the acoustic line data memory unit.
Figure 3:
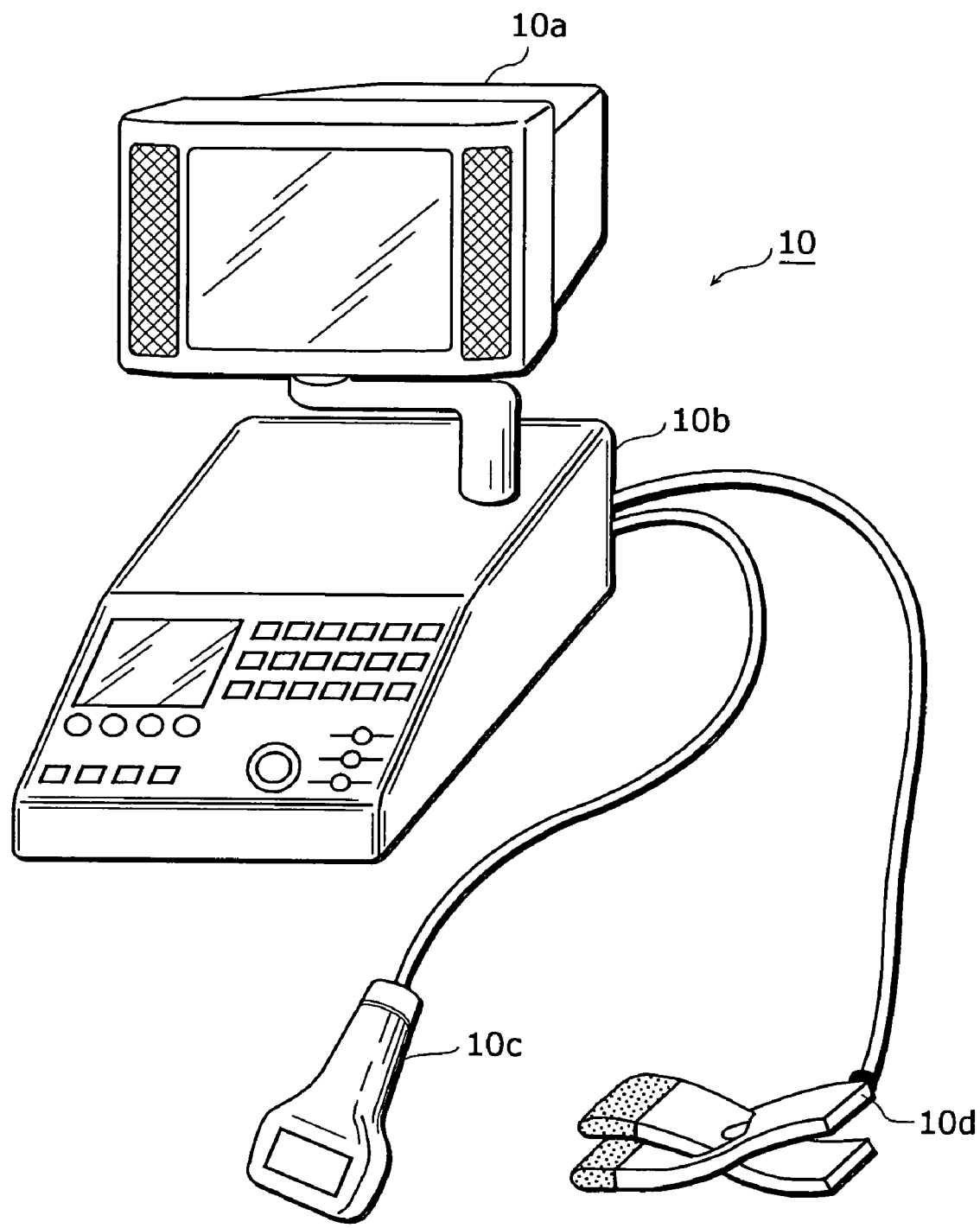
FIG. 3 is an outside drawing of the ultrasonic diagnostic apparatus according to the present invention.
Figure 4:
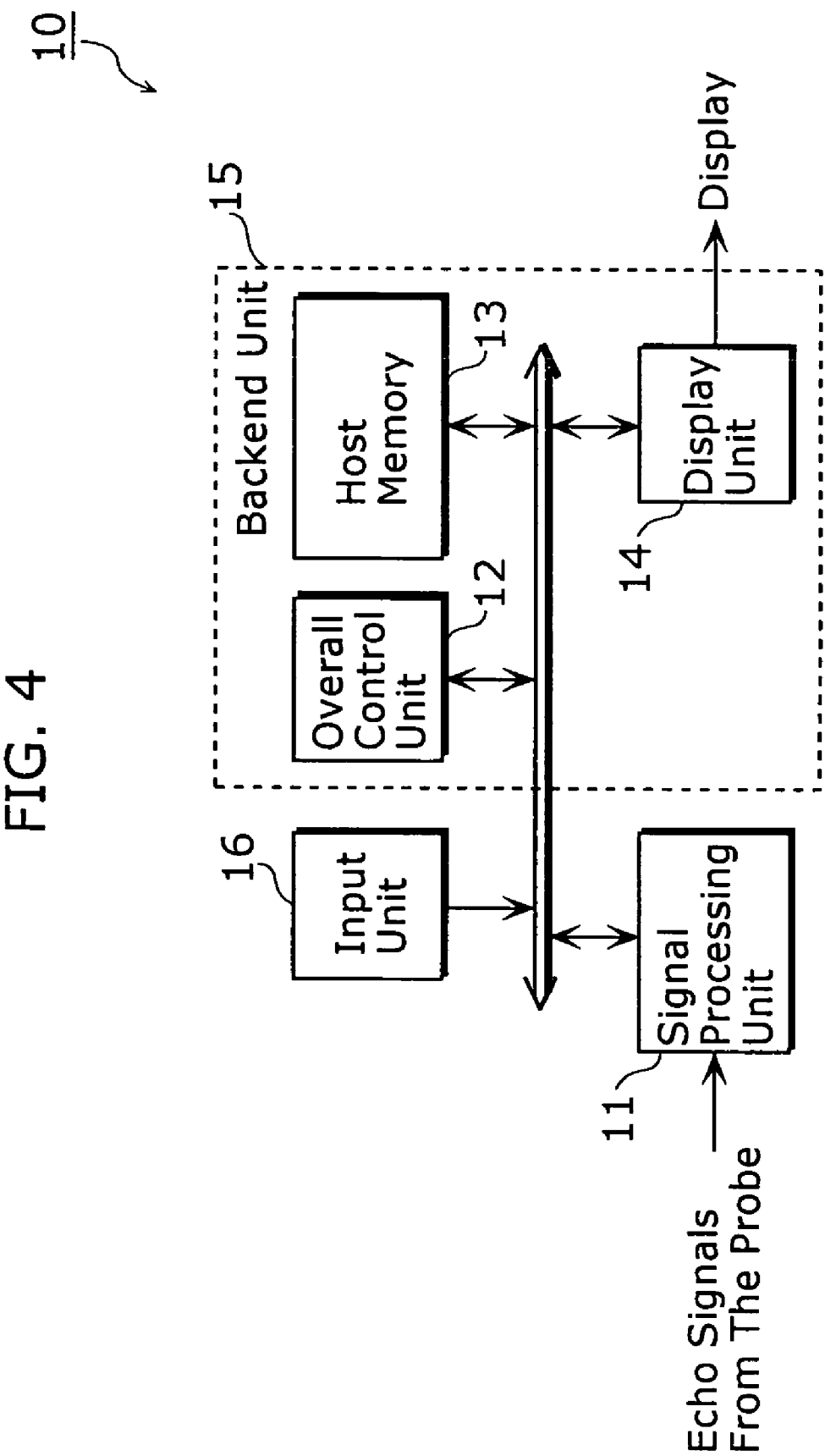
FIG. 4 is a schematic structure diagram of the ultrasonic diagnostic apparatus according to the first and second embodiments.

FIG. 3 is an outside drawing of the ultrasonic diagnostic apparatus 10 according to the present invention. FIG. 4 is a block diagram showing a functional structure of an ultrasonic diagnostic apparatus 10 according to the first embodiment. As shown in FIG. 4, the ultrasonic diagnostic apparatus 10 comprises: a signal processing unit 11, an overall control unit 12, a host memory 13, a display unit 14 and an input unit 16. Also, a backend unit 15 includes the overall control unit 12, the host memory 13 and the display unit 14.

Here, the "backend unit" is a functional unit that performs an image process for generated acoustic line data (in this case, the functional unit between the probe and the unit where the acoustic line data is generated based on the acquired echo signals via the probe is called a "front end unit").

The signal processing unit 11 performs a phasing addition and a filter process for echo signals received via the probe, and generates acoustic line data.

The overall control unit 12 is a functional unit that controls the whole ultrasonic diagnostic apparatus 10, such as a microcomputer equipped with ROM, RAM and the like. In such case as described above, each function of the backend unit 15 is performed according to the control program performed by the overall control unit 12. Also, the host memory 13 can be the main memory or a part of the microcomputer.

In addition, the overall control unit 12 performs an "acoustic line data-display data conversion process" of converting the acoustic line data to display data by performing the following processes for the acoustic line data: a coordinate conversion process, an interpolating process, a frame interpolating process, a frame persistence process and a display color conversion process. At the same time, the overall control unit 12 has the host memory 13 memorize the acoustic line data outputted from the signal process unit 11.

The host memory 13 memorizes the acoustic line data outputted from the signal processing unit 11, according to the direction of the overall control unit 12. Moreover, the host memory 13 provides a work area that is necessary for the "acoustic line data-display data conversion process" performed by the overall control unit 12. The input unit 16 is a functional unit that receives operations from a user, such as a keyboard and a switch.

Also, the ultrasonic diagnostic apparatus 10 as shown in FIG. 4 can be formed by attaching an expansion card that realizes a signal processing unit 11 to an expansion slot of a general personal computer.

Figure 5:
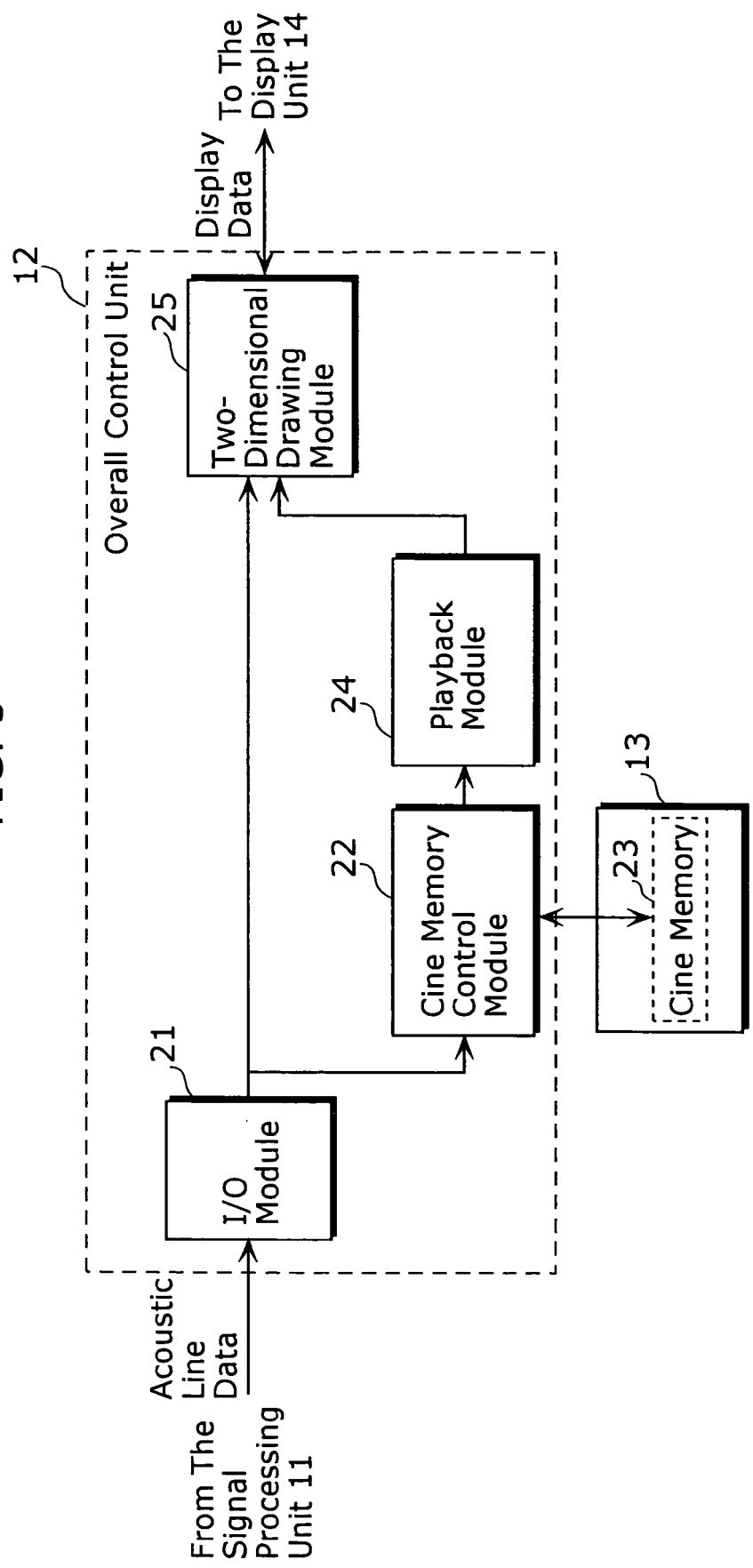
FIG. 5 is a schematic diagram of the software function of the backend unit according to the first embodiment.

FIG. 5 is a block diagram showing a structure of a software which realizes the function of the backend unit 15 as shown in FIG. 4. As shown in FIG. 5, the backend unit 15 includes respective software function as following: an I/O module 21, a cine memory control module 22, a playback module 24 and a two-dimensional drawing module 25 (respective function of the I/O module 21—the two-dimensional drawing module 25 will be described later corresponding to each display mode). In such case as described above, the cine memory control module 22 performs a writing-in and reading-out for the cine memory 23.

Figure 6:
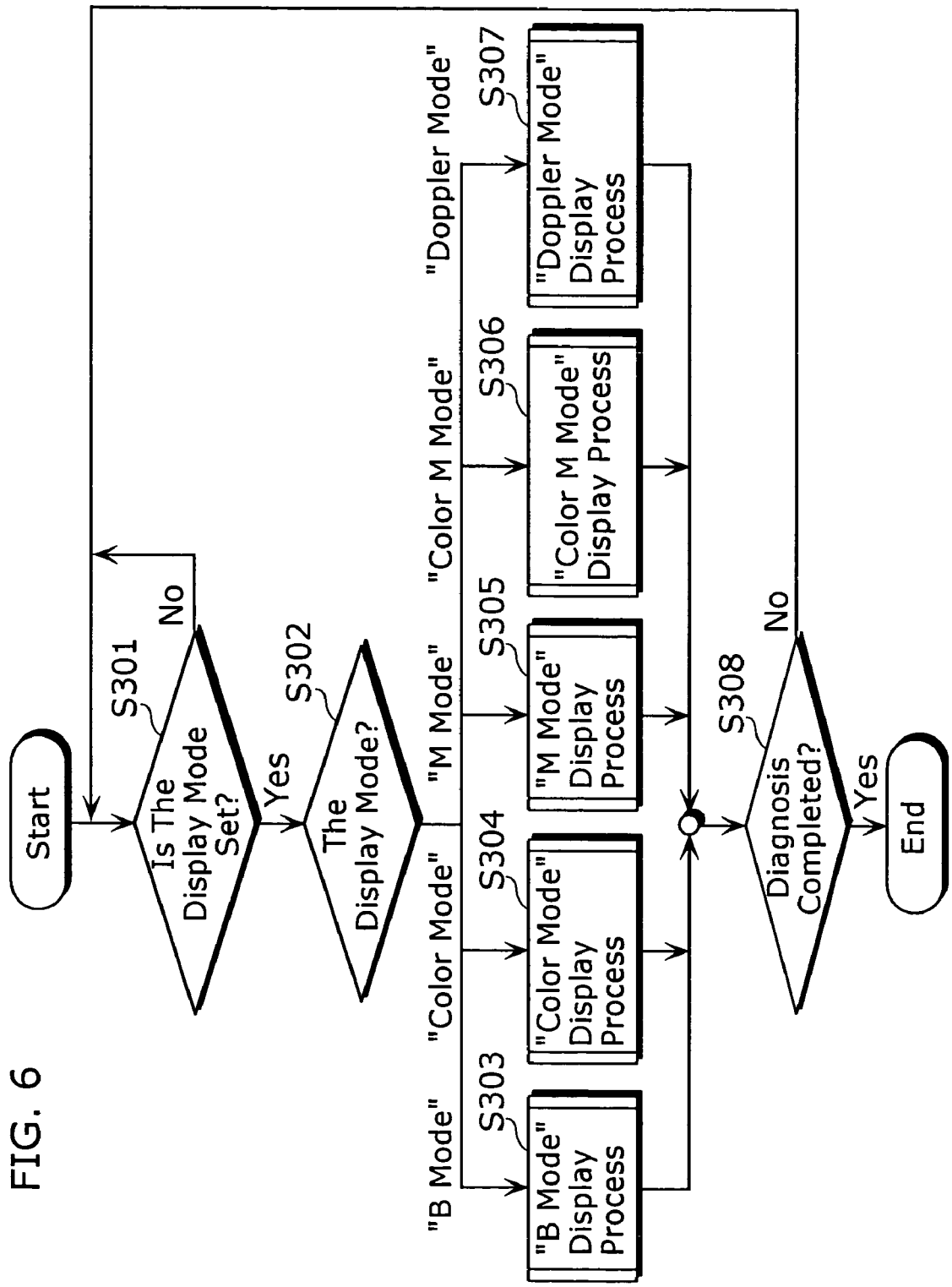
FIG. 6 is an overall flow showing an operational flow of the backend unit according to the first embodiment.

Next, the operations of the backend unit 15 as shown in FIG. 4 will be explained in relation to the display mode of the ultrasonic diagnostic apparatus 10. FIG. 6 is a whole flow showing the operational flow of the backend unit 15.

First, the overall control unit 12 checks whether or not a user has set a display mode. In the case the user has set a display mode (S301: Yes), according to the set (S302), either of the following processes is repeated until the ultrasonic diagnostic apparatus 10 finishes its diagnosis (S301-S308): the "B mode" display process (S303), the "color mode" display process (S304), the "M mode" display process (S305), the "color M mode" display process (S306) and the "Doppler mode" display process (S307).

The functions and operations of each display mode (in addition, a "live mode" and a "cine mode") of the backend unit 15 will be explained as following.

(B Mode)

The operations performed by the "live mode" of "B mode" are as following.

The I/O module 21 acquires acoustic line data from the signal processing unit 11, and has the cine memory 23 of the host memory 13 memorize the acoustic line data via the cine memory control module 22. Also, the I/O module 21 performs a grouping of the acoustic line data included in a frame of a "B mode" image, and transmits the acoustic line data, per frame, to the two-dimensional drawing module 25.

The cine memory control module 22 is a module that reserves a cine memory according to the operational mode on the host memory 13 and performs an input/output operation for the reserved cine memory 23.

The two-dimensional drawing module 25 is periodically activated, and performs a two-dimensional Digital Scan Convert (DSC) process to acoustic line data transmitted from the I/O module 21. And, the two-dimensional drawing module 25 converts the acoustic line data to display data, and transmits the display data to the display unit 14.

Here, the "two-dimensional DSC process" means a series of processes for generating a tomographic image as following: a coordinate conversion process, an interpolating process, a frame interpolating process, a frame persistence process, and a display color conversion process.

Finally, the display unit 14 displays a "B mode" image in the display, according to the display data received from the two-dimensional drawing module 25.

On the other hand, the operations performed by the "cine mode" of the "B mode" are as following.

The playback module 24 reads out the acoustic line data memorized by the cine memory 23 in the "live mode", via the cine memory control module 22. Then, the playback module 24 performs a grouping of the acoustic line data which forms a frame of the "B mode" image, and transmits the acoustic line data, per frame, to the two-dimensional drawing module 25.

The playback module 24 is periodically activated. By making the activation cycle changeable, the playback speed of the "B mode" image can be arbitrarily changed.

The operations performed by the two-dimensional drawing module 25 and the display unit 14 are the same as the "live mode" of the "B mode".

Also, as described above, the two-dimensional drawing module 25 can flexibly change the algorithm of the interpolating process, the operation of the frame interpolating process and the like, according to the acquisition rate (frame rate) of the acoustic line data outputted from the signal processing unit 11, and according to the display rate with which the two-dimensional drawing module 25 itself transmits the display data to the display unit 14. Here, the operations performed by the two-dimensional drawing module 25 will be explained in further detail using a flow chart.

Figure 7:
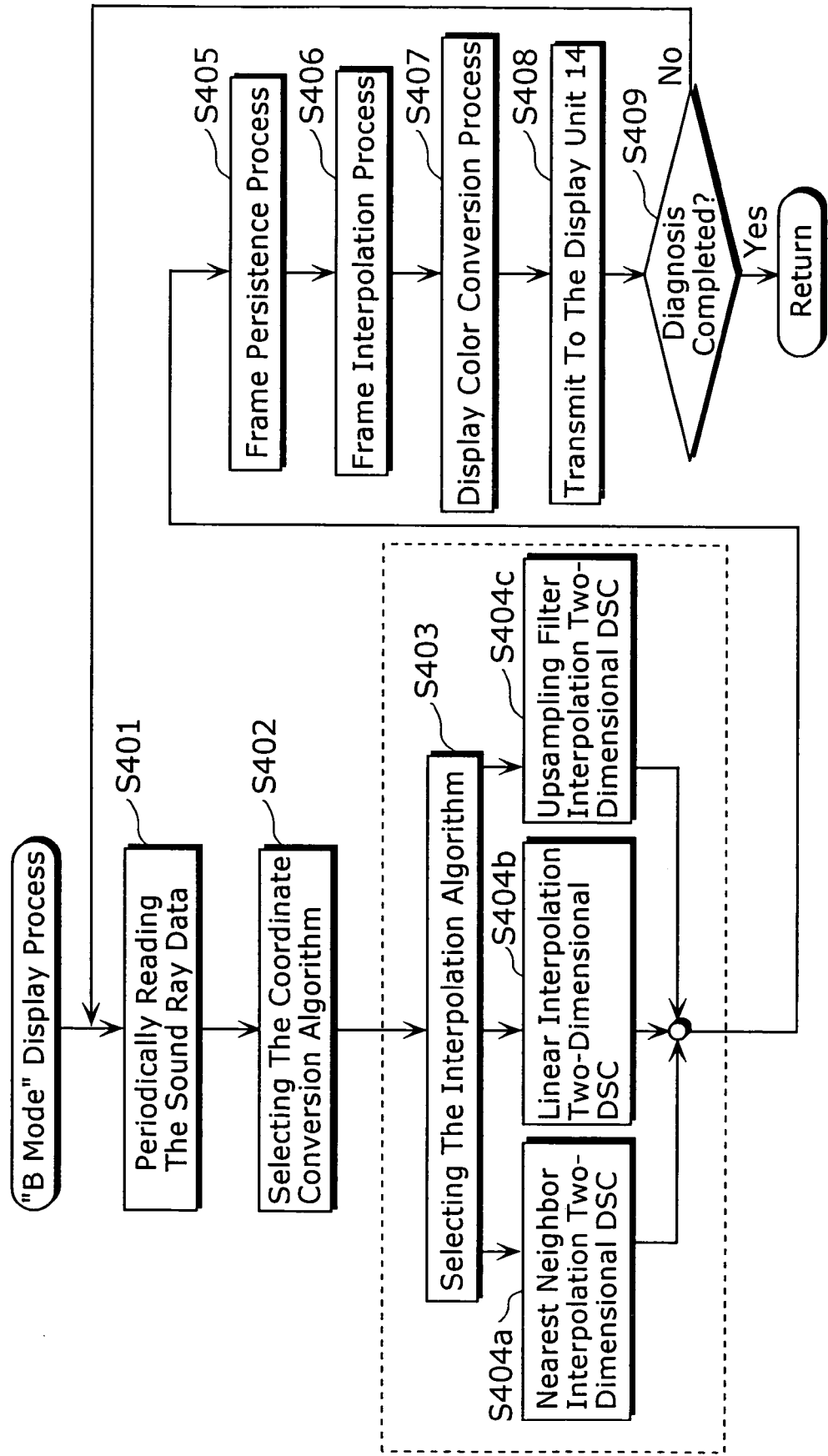
FIG. 7 is a flow chart of the "B mode" of the two-dimensional drawing module according to the first embodiment.

FIG. 7 is a flow chart showing a flow of the operations performed by the two-dimensional drawing module 25 in the display mode of the "B mode".

First, the two-dimensional drawing module 25 periodically reads the acoustic line data forming a frame of the "B mode" image (S401). Although it is not shown in FIG. 6, in the case where the frame rate of the acoustic line data generated by the signal processing unit 11 is low, as the time space in which the acoustic line data is transmitted becomes long, it is possible to lower the rate (lengthening the time space) with which the acoustic line data is read. As a result, it is possible to lower the renewal rate (the number of display frames per unit time) of the display data in the display unit 14, and to reduce the burden of the two-dimensional drawing module 25 according to the overall control unit 12.

Next, the two-dimensional drawing module 25 checks (a) the scanning method of the physical structure of the probe and (b) the scanning method of the acoustic line data, and selects the coordinate conversion algorithm suitable for the two scanning methods (a) and (b) as described above (S402). For example, in the case of the sector-convex type probe, the "polar-orthogonal coordinate conversion process" is selected; and in the case of the linear type probe, the "orthogonal-orthogonal coordinate conversion process" is selected.

Next, the two-dimensional drawing module 25 selects the interpolation algorithm for the two-dimensional DSC process, according to the renewal rate of the display data (S403). As the criteria for selecting the interpolation algorithm, the processing cycle of the interpolation algorithm which is a selection candidate is shorter than the renewal cycle of the display data, and the CPU occupancy of the overall control unit 12 is considered. And, the interpolation algorithm of the highest image quality is selected among the interpolation algorithms fulfilling such selection conditions as described above.

As described above, the renewal rate of the display data can be decided, according to the frame rate of the acoustic line data. Thus, it can be considered that the interpolation algorithm is selected according to the frame rate of the acoustic line data.

As the interpolation algorithm, for example, there are the nearest neighbor interpolating method, a linear interpolating method and an upsampling filter method. However, other interpolating methods can be used, as well.

The comparison of the processing time of each interpolation algorithm is as following:

$$\text{the nearest neighbor interpolating method} < \text{the linear interpolating method} < \text{the upsampling filter method} \quad (1)$$

The upsampling filter method has the highest image quality; on the other hand, the processing burden is the biggest. Here, the outline of such respective interpolating method as described above will be explained as following.

Figure 8:
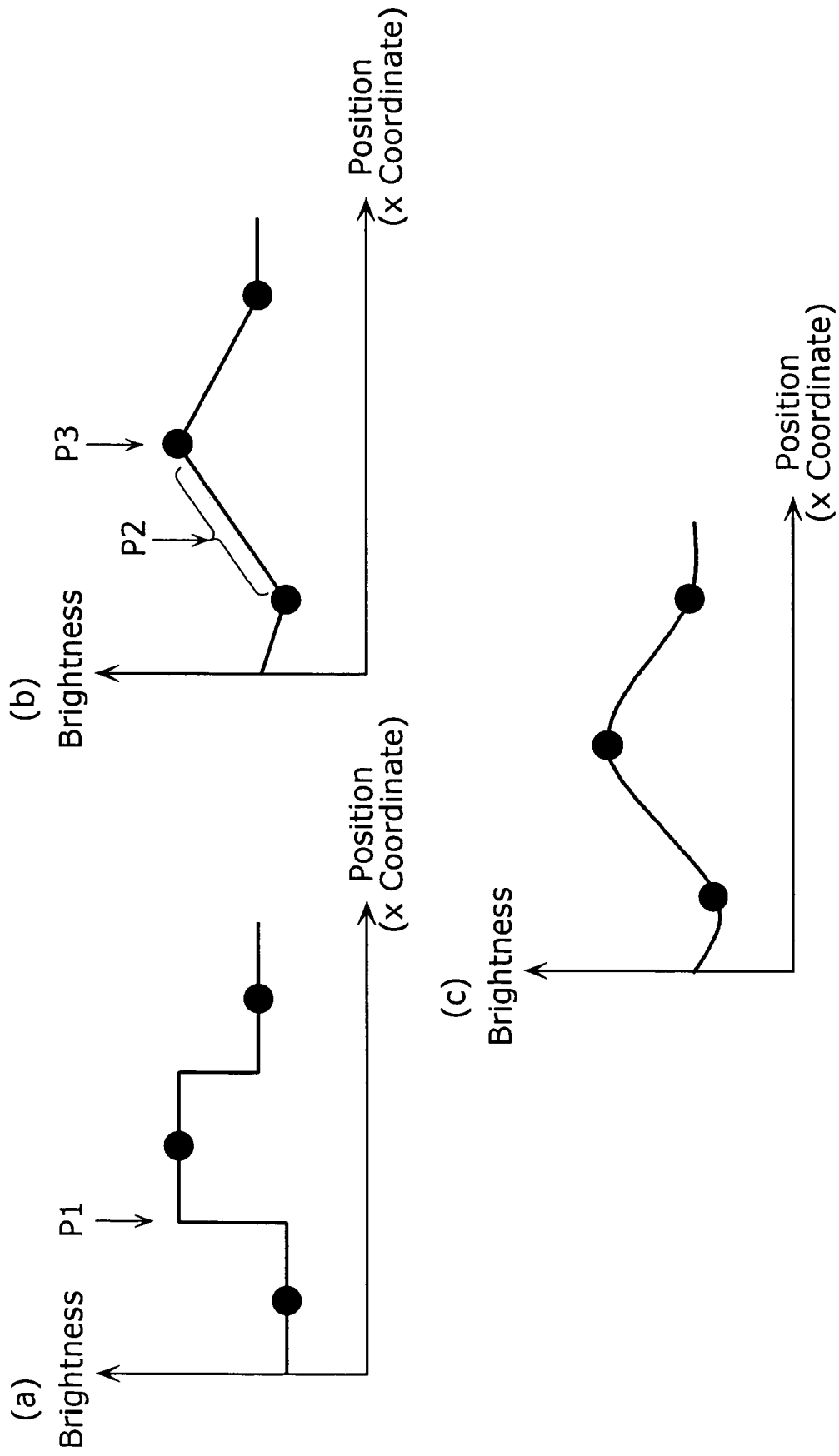
FIG. 8(a) is a brief diagram showing an interpolation performed using the nearest neighbor interpolating method.
FIG. 8(b) is a brief diagram showing an interpolation performed using the linear interpolating method.
FIG. 8(c) is a brief diagram showing an interpolation performed using the upsampling filter method.

FIG. 8(a)-(c) are diagrams for explaining the outline of respective interpolation in the case where an interpolation is performed by such respective interpolating method as described above. As the subject for the interpolation, FIG. 8(a)-(c) show the examples of interpolating the value of brightness in an arbitrary position (for convenience, a position in an arbitrary "x" coordinate is provided here). Also, the black dot "●" indicates the data (original data) used in the interpolation process.

The outline of respective interpolation is shown as following: FIG. 8(a) for the case where the interpolation is performed by the nearest neighbor interpolating method; FIG. 8(b) for the case where the interpolation is performed by the linear interpolating method; and FIG. 8(c) for the case where the interpolation is performed by the upsampling filter method. In the case where the nearest neighbor interpolating method is used as shown in FIG. 8(a), as the brightness suddenly changes in the position of P1, the image becomes discontinuous and lacks smoothness. In addition, in the case where the linear interpolating method is used as shown in FIG. 8(b), a relatively smooth image can be acquired around P2; however, it becomes a so-called edgy image in the position of P3. Furthermore, in the case where the upsampling filter method is used as shown in FIG. 8(c), as a smooth continuous interpolation is performed, a natural image which does not have any discrepancies as a whole can be acquired.

Then, the two-dimensional drawing module 25 (i) performs a two-dimensional DSC process using the selected coordinate conversion algorithm and interpolation algorithm, and (ii) generates display data (S404a, 404b or 404c).

Next, the two-dimensional drawing module 25 performs a persistence process of the display data (S405). The persistence process means performing the weighted addition of the present "B mode" image data and the past "B mode" image data (IIR filter process), and has effects to decrease the spike noise which occurs only in single frame. Thus, an image with the appearance of little roughness can be acquired.

However, in the case where the renewal rate of the display data of the display unit 14 is low, the overlapping movements of the "B mode" image of the long period can be displayed, causing the visibility of the subject to deteriorate. Thus, the two-dimensional drawing module 25 determines the necessity or unnecessity of the persistence process and the rate of the weighted addition in the case of performing the persistence process, according to the renewal rate of the display data of the display unit 14.

In addition, the two-dimensional drawing module 25 newly generates a "B mode" image data between the present "B mode" image data and the past "B mode" image data by using the frame interpolation (S406). In the case where the renewal rate of the display data of the display unit 14 is low, the frame interpolation has effects to prevent the "B mode" image for display from advancing frame by frame and to make it look smooth. Thus, the two-dimensional drawing module 25 selects the necessity or unnecessity of the frame interpolation and determines the number of the frames to generate by interpolating, in the case of performing the frame interpolation, according to the renewal rate of the display data of the display unit 14.

Here, in the frame persistence process and the frame interpolating process, as well as the interpolation algorithm, it can be considered that making a decision according to the renewal rate of the display data means making a decision according to the frame rate of the acoustic line data.

Finally, the two-dimensional drawing module 25 performs a display color conversion process (S407). The display color conversion process includes a gamma control interfacing with the display characteristics of the display which is connected to the display unit 14, improvement of the contrast of the "B mode" image and the application of the color map. Then, the two-dimensional drawing module 25 transmits the display data (B mode image) to the display unit 14 (S408). Such processes as described above are repeated while the diagnosis of the present ultrasonic diagnostic apparatus continues (S401-S409).

Although the case where the frame interpolation process and the frame persistence process are performed after the coordinate conversion process is explained above, such processes can be performed for acoustic line data before the coordinate conversion process. Specific explanations will be omitted here.

Here, in consideration with the communication of the ultrasonic echo, in order for the ultrasonic echo transmitted from the probe to reflect within the subject and get received by the probe, it takes time corresponding to the speed with which the ultrasonic echo is transmitted within the subject and the depth of the part where the ultrasonic echo is reflected within the subject. In other words, per one acoustic line data, it takes time corresponding to the depth for scanning within the subject.

And, in order to scan for one frame, it takes as much time as the number of acoustic line data which forms one frame. The number of the acoustic line data which forms one frame is decided by the frame width and the density of the acoustic line data.

When the above is taken into consideration, the following steps can be performed according to the depth, width and density in scanning the subject: selection of the interpolation algorithm (S403), determining the necessity or unnecessity of the frame persistence process and the rate of the weighted addition (S405), determining the necessity or unnecessity of the frame interpolating process and the number of the frames to generate (S406).

In such procedures as described above, the following processes can be performed not only individually, but also in association with each other: selection of the interpolation algorithm (S403), determining the necessity or unnecessity of the frame persistence process (S405) and determining the necessity or unnecessity of the frame interpolating process and the number of the frames to generate (S406).

In other words, considering the case where such functions as described above are all performed by single processor, in the case where the frame rate of the tomographic image data is extremely fast, and the renewal rate of the display data must be speeded up, even if the nearest neighbor interpolating method is selected as the interpolation algorithm, there might be a case where the processing performance of the overall control unit 12 is not good enough in order to perform the frame persistence process and the frame interpolating process. In such case as described above, the frame persistence process and the frame interpolating process are omitted; and the number of the frames to generate in the frame interpolating process is reduced.

(Color Mode)

The operations performed by the "live mode" of the "color mode" are as following.

I/O module 21 acquires acoustic line data indicating blood flow information from the signal processing unit 11, and memorizes the acoustic line data in the cine memory 23, using the cine memory control module 22. And, the I/O module 21 performs a grouping of the acoustic line data forming a frame of a "color mode" image, and transmits the acoustic line data, per frame, to the two-dimensional drawing module 25.

The two-dimensional drawing module 25 is periodically activated, and performs a two-dimensional DSC process for the acoustic line data transmitted from the I/O module 21. And, the two-dimensional drawing module 25 converts the acoustic line data to display data, and transmits the display data to the display unit 14.

The two-dimensional DSC process of the "color mode" includes the following processes: a coordinate conversion process, an interpolating process, a frame interpolating process, a frame persistence process and a display color conversion process.

Finally, the display unit 14 displays the "color mode" image in the display.

On the other hand, the operations performed by the "cine mode" of the "color mode" are as following.

The playback module 24 reads out the acoustic line data indicating the blood flow information which is memorized by the cine memory 23 in the "live mode", using the cine memory control module 22. Then, the playback module 24 performs a grouping of the acoustic line data forming the frame of the "color mode" image, and transmits the acoustic line data, per frame, to the two-dimensional drawing module 25.

The playback module 24 is periodically activated. By making the activation cycle changeable, the playback speed of the color mode image can be arbitrarily changed.

The operations performed by the two-dimensional drawing module 25 and the display unit 14 are the same as the live mode of the "color mode".

Also, in the "color mode", the process of the "B mode" is simultaneously performed; and in general, the "color mode" image is displayed overlapping the "B mode" image in the display unit 14.

Here, as well as the "B mode", the two-dimensional drawing module 25 can flexibly change the algorithm of the interpolating process, the operation of the frame interpolating process and the like, according to (a) the acquisition rate (frame rate) of the acoustic line data indicating the blood flow information which is outputted from the signal processing unit 11 and (b) the display rate with which the two-dimensional drawing module 25 itself transmits the display data to the display unit 14.

(M Mode)

The operations performed by the "live mode" of the "M mode" are as following.

I/O module 21 acquires acoustic line data indicating tomographic image information in the same acoustic line position from the signal processing unit 11, and memorizes the acoustic line data in the cine memory 23, using the cine memory control module 22. Then, the I/O module 21 transmits the acoustic line data to the two-dimensional drawing module 25. The two-dimensional drawing module 25 holds a fixed area for the acoustic line data of one picture in the "M mode".

The two-dimensional drawing module 25 is periodically activated, and writes the acoustic line data transmitted from the I/O module 21 in the next area to the previous write-in area within the holding acoustic line data area. Then, the two-dimensional drawing module 25 performs a two-dimensional DSC process for the holding acoustic line data, and converts the acoustic line data to display data. And, the two-dimensional drawing module 25 transmits the display data to the display unit 14.

The two dimensional DSC process of the "M mode" includes the following processes: a coordinate conversion process, an interpolating process and a display color conversion process. Finally, the display unit 14 displays an "M mode" image in the display.

On the other hand, the operations performed by the "cine mode" of the "M mode" are as following.

The playback module 24 reads out the acoustic line data memorized in the "live mode" from the cine memory 23, via the cine memory control module 22. Then, the playback module 24 transmits the acoustic line data to the two-dimensional drawing module. The playback module 24 is periodically activated. By making the activation cycle changeable, the playback sweep rate of the "M mode" image can be arbitrarily changed.

The operations performed by the two-dimensional drawing module 25 and the display unit 14 are the same as the "live mode" of the "M mode".

Here, as well as the "B mode", the two-dimensional drawing module 25 can flexibly change the algorithm of the interpolating process, according to (a) the acquisition rate (sweep rate) of the acoustic line data in the same acoustic line position which is outputted from the signal processing unit 11 and (b) the display rate with which the two-dimensional drawing module 25 itself transmits the display data to the display unit 14. Thus, the operations performed by the two-dimensional drawing module 25 in the "M mode" will be explained in further detail by using a flow chart.

Figure 9:
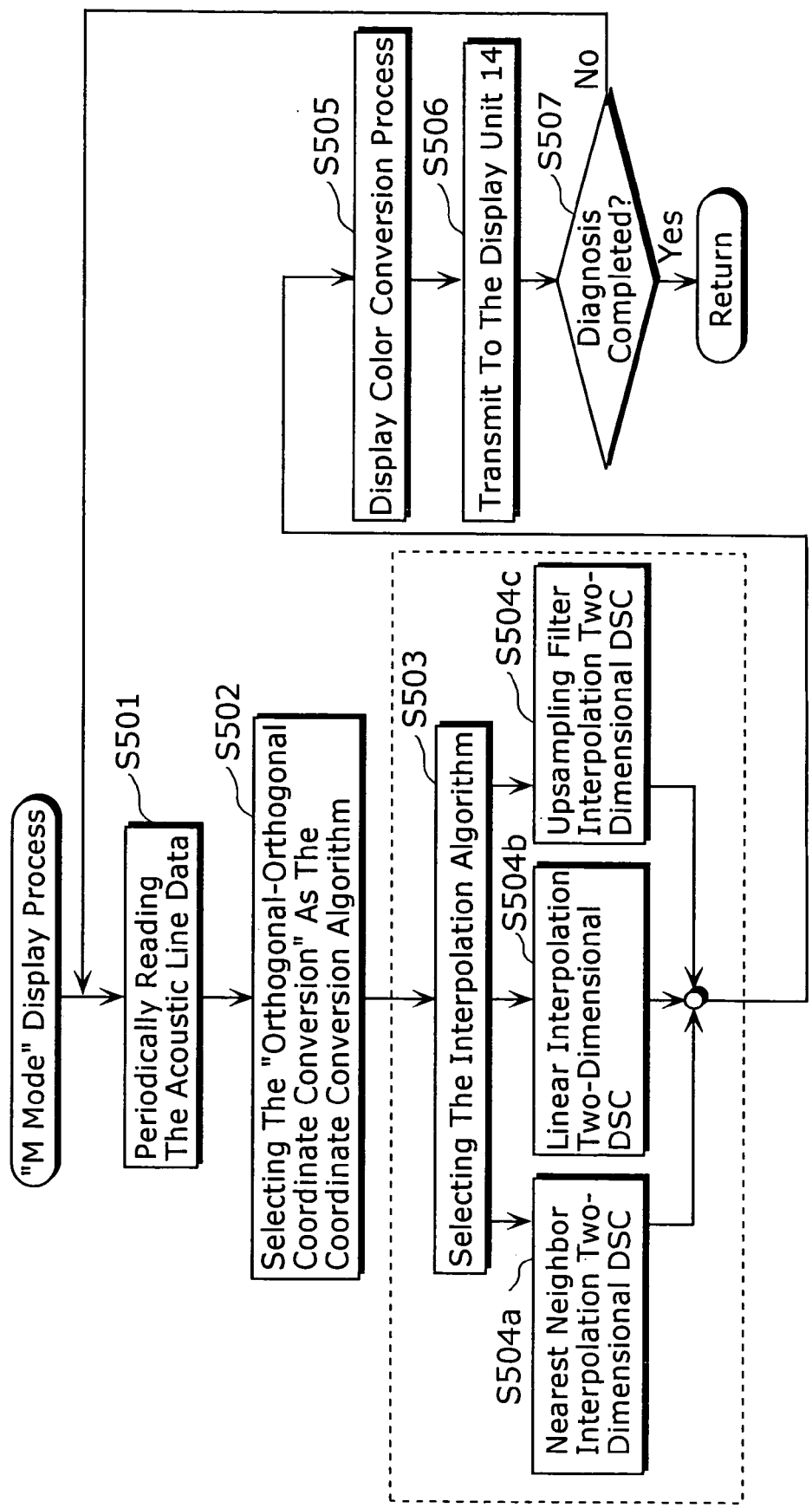
FIG. 9 is a flow chart showing an operational flow of the "M mode" of the two-dimensional drawing module according to the first embodiment.

FIG. 9 is a flow chart showing a flow of the operations performed by the two-dimensional drawing module 25 of the "M mode".

First, the two-dimensional drawing module 25 periodically reads the acoustic line data which forms an "M mode" image (S501). Although it is not shown in FIG. 9, in the case where the rate of the acoustic line data generated by the signal processing unit 11 is slow, that is, the sweep rate of the "M mode" image is slow, as the time space where the acoustic line data is transmitted becomes longer, as well as the "B mode", the rate for reading the acoustic line data can be decreased (the time space can be lengthened).

Next, the two-dimensional drawing module 25 selects the "orthogonal-orthogonal conversion process" as the coordinate conversion algorithm (S502). In the "M mode" the "orthogonal-orthogonal coordinate conversion" process is always performed.

Next, the two-dimensional drawing module 25 selects the interpolation algorithm of the two-dimensional DSC process, according to the renewal rate of the display data of the display unit 14 (S503). As the criteria for selecting the interpolation algorithm, the processing time in the interpolation algorithm which is a selection candidate is shorter than the renewal cycle of the display data, and the CPU occupancy of the overall control unit 12 is considered. The interpolation algorithm of the highest image quality is selected among the interpolation algorithms which fulfill such selection conditions as described above.

As described above, the renewal rate of the display data can be decided according to the sweep rate of the "M mode" image. Thus, it can be considered that the interpolation algorithm is selected according to the sweep rate of the "M mode" image.

As the interpolation algorithm, there are the nearest neighbor interpolating method (S504*a*), a linear interpolating method (S504*b*) and an upsampling filter method (S504*c*). However, other methods can be used, as well.

Finally, the two-dimensional drawing module 25 performs a display color conversion process (S505). The display color conversion process includes: a gamma control interfacing with the display characteristics of the display which is connected to the display unit 14, improvement of the contrast of the "M mode" image and the application of the color map. After that, the two-dimensional drawing module 25 transmits the display data (M mode image) to the display unit 14 (S506).

Then, in the case where the diagnosis of the "M mode" continues, such processes as described above are repeated (S501-S507).

(Color M Mode)

The operations performed by the "live mode" of the "color M mode" are as following.

I/O module 21 acquires acoustic line data indicating blood flow information in the same acoustic line position from the signal processing unit 11, and memorizes the acoustic line data in the cine memory 23, using the cine memory control module 22. Then, the I/O module 21 transmits the acoustic line data to the two-dimensional drawing module 25.

The two-dimensional drawing module 25 holds a fixed area for the acoustic line data of one picture in the "color M mode".

The two-dimensional drawing module 25 is periodically activated, and writes the acoustic line data transmitted from the I/O module 21 in the next area to the previous write-in area within the holding acoustic line data area. Then, the two-dimensional drawing module 25 performs a two-dimensional DSC process to the holding acoustic line data, and converts the acoustic line data to display data. And, the two-dimensional drawing module 25 transmits the display data to the display unit 14. Here, the two-dimensional DSC process includes the following series of processes: a coordinate conversion process, an interpolating process and a display color conversion process.

Finally, the display unit 14 displays a "color M mode" image in the display.

On the other hand, the operations performed by the "cine mode" of the "color M mode" are as following.

The playback module 24 reads out the acoustic line data indicating the blood flow information which is memorized by the cine memory 23 in the "live mode", using the cine memory control module 22. Then, the playback module 24 transmits the acoustic line data to the two-dimensional drawing module 25.

The playback module 24 is periodically activated. By making the activation cycle changeable, the playback sweep rate of the "color M mode" can be arbitrarily changed. The operations performed by the two-dimensional drawing module 25 and the display unit 14 are the same as the "live mode".

Also, in the "color M mode" the process of such "M mode" as described above is simultaneously performed; and in general, the "color M mode" image is displayed overlapping the "M mode" image in the display unit 14.

Here, as well as the "M mode", the two-dimensional drawing module 25 can flexibly change the algorithm of the interpolating process, according to (a) the acquisition rate (sweep rate) of the acoustic line data indicating the blood flow information which is outputted by the signal processing unit 11 and (b) the display rate with which the two-dimensional drawing module 25 itself transmits the display data to the display unit 14.

(Doppler Mode)

The operations performed by the Doppler mode are as following.

I/O module 21 acquires acoustic line data indicating Doppler spectrum information from the signal processing unit 11, and memorizes the acoustic line data in the cine memory 23, using the cine memory control module 22. Then, the I/O module 21 transmits the acoustic line data to the two-dimensional drawing module 25.

The two-dimensional drawing module 25 holds a fixed area for the acoustic line data of one picture in the "Doppler mode".

The two-dimensional drawing module 25 is periodically activated, and writes the acoustic line data transmitted from the I/O module 21 in the next area to the previous write-in area within the holding acoustic line data area. Then, the two-dimensional drawing module 25 performs a two-dimensional DSC process for the holding acoustic line data, and converts the acoustic line data to a display data. And, the two-dimensional drawing module 25 transmits the display data to the display unit 14.

The two-dimensional DSC process of the "Doppler mode" includes the following processes: a coordinate conversion process, an interpolating process and a display color conversion process.

Finally, the display unit 14 displays the "Doppler mode" image in the display.

On the other hand, the operations performed by the "cine mode" of the "Doppler mode" are as following.

The playback module 24 reads out the acoustic line data indicating the Doppler spectrum information which is memorized by the cine memory 23 in the "live mode", using the cine memory control module 22. Then, the playback module 24 transmits the acoustic line data to the two-dimensional drawing module 25.

The playback module 24 is periodically activated. By making the activation cycle changeable, the playback sweep rate of the Doppler mode image can be arbitrarily changed. The operations performed by the two-dimensional drawing module 25 and the display unit 14 are the same as the "live mode" of the "Doppler mode".

Here, as well as the "M mode", the two-dimensional drawing module 25 can flexibly change the algorithm of the interpolating process, according to the (a) acquisition rate (sweep rate) of the acoustic line data indicating the Doppler spectrum information which is outputted from the signal processing unit 11, and (b) the display rate with which the two-dimensional drawing module 25 itself transmits the display data to the display unit 14.

Thus, the functions and operations of the software performed by the overall control unit 12 in each operational mode are described as above. There are some functional blocks that are used in some operational modes, but not in other operational modes.

For example, in the "live mode" of any operational mode, the I/O module 21 is used, but the playback module 24 is not used. In the "cine mode" the I/O module 21 is not used, but the playback module 24 is used.

Also, the functional block which performs the frame persistence process and the frame interpolating process in the two-dimensional drawing module 25 is used in the "B mode" and the "color mode", but is not used in the other operational modes.

As the conventional ultrasonic diagnostic apparatus 100, in the case where each functional block is implemented separately, the functional blocks that are not used are wasteful. However, such plurality of unused functional blocks can be formed to be performed by single processor of the overall control unit 12. Then, by forming a structure where the process of the processor is provided only to the operating functional blocks, the waste is avoided; and the processing ability of the overall control unit 12 can be efficiently utilized.

Although only the case where each operational mode individually operates has been described, so far, it is possible to simultaneously perform a plurality of operational modes by combining, for example, the "B mode" and the "M mode", and the "color mode" and the "Doppler mode", and display two or more images in a row in the display unit 14. In such case as described above, for example, in the combination of the "B mode" and the "M mode", generally the display renewal rate of the "M mode" image is more important than the display renewal rate of the "B mode" image in terms of the usability of the display.

Thus, in the case where the processes of the "B mode" and the "M mode" are performed by single processor of the overall control unit 12, the display data of the "B mode" image and the "M mode" image is generated by the two-dimensional drawing module 25, and in the case where there is a shortage in the processing ability of the processor, for example, the process of the "B mode" can be performed in the double cycle of the process of the "M mode". By forming such structure as described above, as usable a display as possible can be achieved within the limit of the processing ability of the overall control unit 12.

Finally, the method of the cine memory control module 22 to reserve the area for the cine memory 23 in the host memory 13 will be explained.

In the "B mode", the "M mode" and the "Doppler mode", respectively, only the acoustic line data of the "B mode", the "M mode" and the "Doppler mode" is memorized in the cine memory 23.

On the other hand, in the "color mode" and the "color M mode", the acoustic line data of both the "B mode" and the "color mode" or the acoustic line data of both the "M mode" and the "color M mode" is memorized in the cine memory 23.

In addition, in the case where a plurality of operational modes such as the "B mode" and the "M mode" are combined and performed simultaneously, the acoustic line data of the number of kinds according to the plurality of operational modes is memorized in the cine memory 23.

Thus, depending on the operational mode of the ultrasonic diagnostic apparatus, the use situation of the cine memory 23 differs. If the overall control unit 12 dynamically reserves the cine memory 23 in the host memory 13, according to the operational mode of the ultrasonic diagnostic apparatus, via the cine memory control module 22, without wasting the memory area which corresponds to the unused operational mode, all the area of the host memory 13 which can be used as the cine memory 23 can be efficiently utilized.

By forming the ultrasonic diagnostic apparatus with such structure as described above, in the two-dimensional DSC process, it is possible to flexibly change the algorithm of the interpolating process, the frame interpolating process and the like. And, by efficiently utilizing the resource, the image of high image quality can be acquired as far as the resource permits.

Moreover, by dynamically reserving the cine memory area, the host memory area can be efficiently utilized; and the cost of the system can be reduced.

Second Embodiment

While the ultrasonic diagnostic apparatus 10 according to the first embodiment enables the display of the two-dimensional tomographic image, the ultrasonic diagnostic apparatus 20 according to the second embodiment enables the display of the image which three-dimensionally displays the inner state of the subject. Also, the structure of the ultrasonic diagnostic apparatus 20 according to the second embodiment is similar to that of the ultrasonic diagnostic apparatus 10 according to the first embodiment. Thus, only the different functional structure will be explained; and the common functional structure will be omitted here. In addition, as well as the first embodiment, the function of the backend unit of the ultrasonic diagnostic apparatus 20 according to the second embodiment is achieved as a software performed by the overall control unit 32 (refer to FIG. 10 described below).

Figure 10:
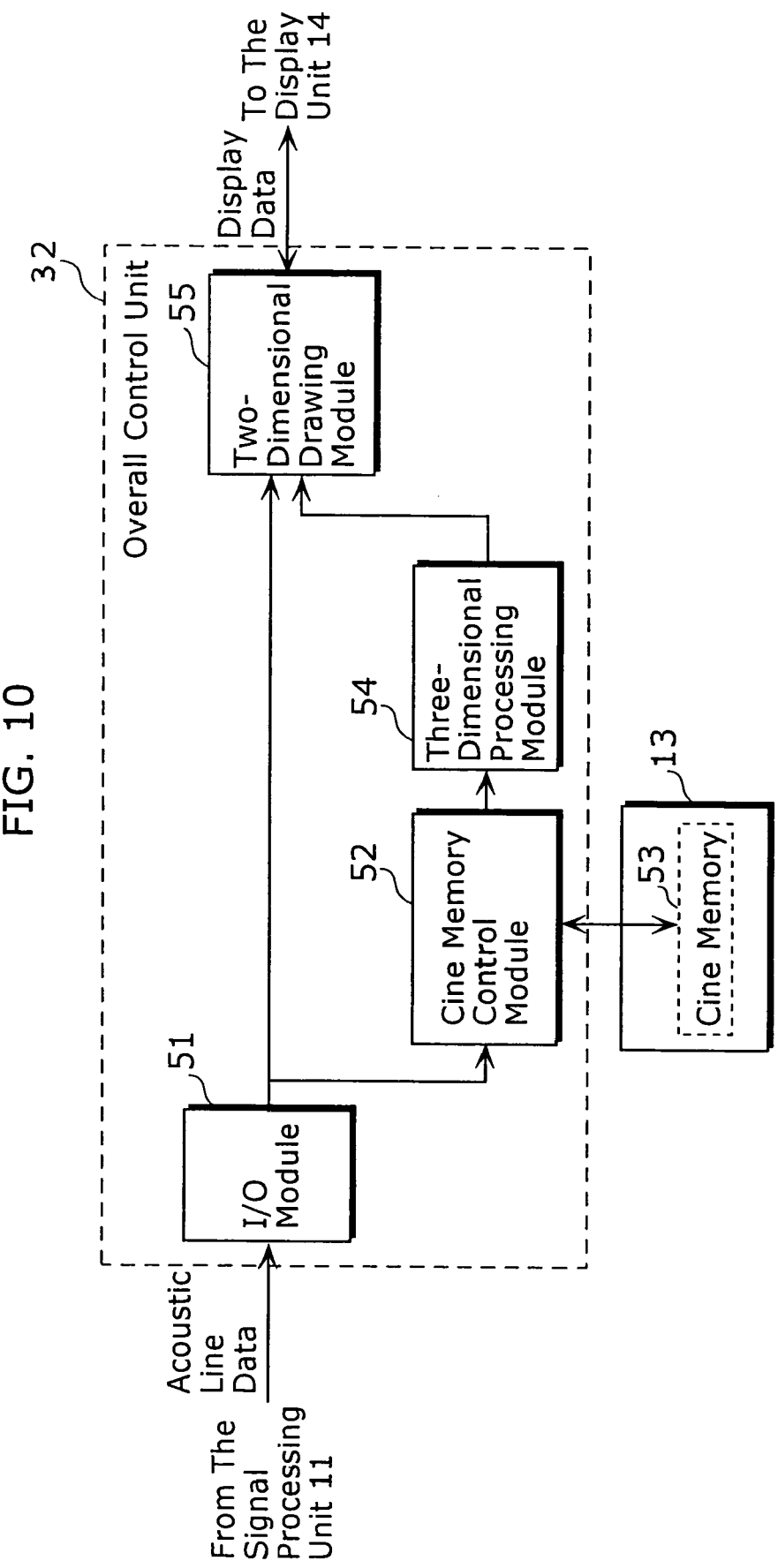
FIG. 10 is a schematic diagram of a software function of the backend unit according to the second embodiment.

FIG. 10 is a block diagram showing a structure of the software function performed by the overall control unit 32 according to the second embodiment. As shown in FIG. 10, the backend unit includes: I/O module 51, the cine memory control module 52, the cine memory 53, the three-dimensional processing module 54 and the two-dimensional drawing module 55.

Next, the functions and operations of the software performed by the overall control unit 32 according to the second embodiment will be explained for each operational mode of the ultrasonic diagnostic apparatus 20.

(3D Live Mode)

I/O module 51 acquires acoustic line data from the signal processing unit 11, and memorizes the acoustic line data in the cine memory 53, via the cine memory control module 52. Then, the I/O module 51 performs a grouping of the acoustic line data which forms a frame of the tomographic image, and transmits the acoustic line data, per frame, to the two-dimensional drawing module 55.

Also, when the acquisition of a tomographic image data group which forms a volume is completed, the three-dimensional processing module 54 performs a three-dimensional DSC process (such as a coordinate conversion process and an interpolating process) for the acoustic line data forming the volume, and converts the acoustic line data to a volume data. Then, the three-dimensional processing module 54 generates three-dimensional image data (image data describing a volume) by performing a volume rendering process for volume data, and transmits the three-dimensional image data to the two-dimensional drawing module 55.

Also, the volume data generated by the three dimensional DSC process is memorized in the cine memory 53, via the cine memory control module 52; and the last piece of the volume data is held for using in the "MPR mode".

The two-dimensional drawing module 55 is periodically activated, and performs a two-dimensional DSC process for the acoustic line data of the tomographic image frame or the three-dimensional image data generated by the three-dimensional processing module 54. And, the two-dimensional drawing module 55 converts the above mentioned acoustic line data and three-dimensional image data to display data, and transmits the display data to the display unit 14.

The two-dimensional DSC process of the "3D live mode" includes: a coordinate conversion process, an interpolating process, a frame interpolating process, a frame persistence process and a display color conversion process.

Finally, the display unit 14 displays the tomographic image and the three-dimensional image data in the display.

Also, the cine memory control module 52 reserves a cine memory amount corresponding to an operational mode on the host memory 13, and performs an input/output operation for the reserved cine memory 53.

Here, as described above, the operations performed by the three-dimensional processing module 54 must be able to flexibly change, according to (a) the acquisition rate (volume rate) of the acoustic line data forming the volume which is outputted from the signal processing unit 11 and (b) the acquisition amount (data size forming the volume).

Figure 11:
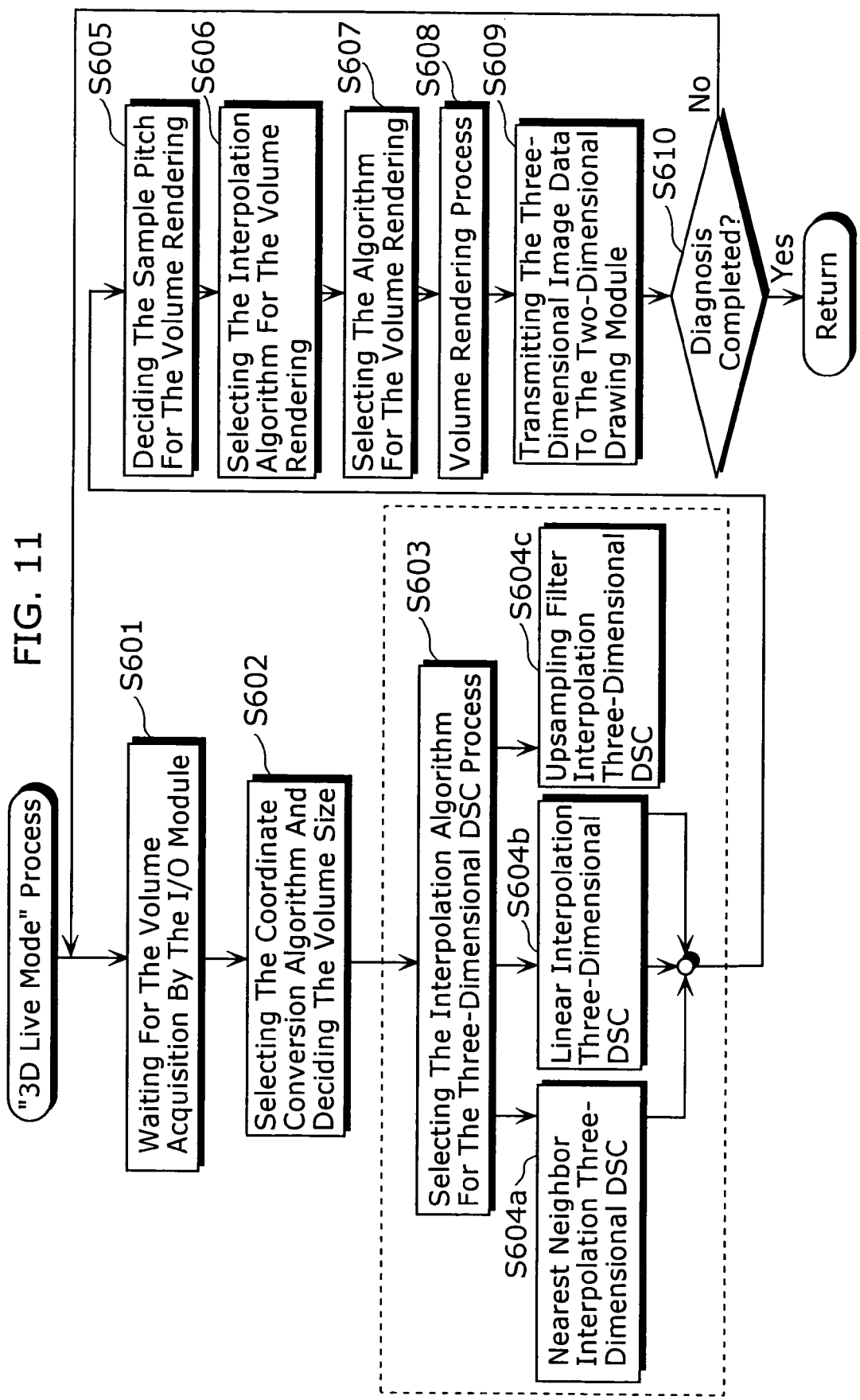
FIG. 11 is a flow chart showing a flow of the procedure of the three-dimensional processing module according to the second embodiment.

The operations performed by the three-dimensional processing module 54 will be explained in further detail using a flow chart as following. FIG. 11 is a flow chart showing the operational flow performed by the three-dimensional processing module 54 in the "3D live mode".

First, when the acquisition of a tomographic image data group which forms a volume is completed by the I/O module (S601), the three-dimensional processing module 54 selects a coordinate conversion algorithm and decides the volume size (S602). For example, in the case of a 3D probe that mechanically sways a sector convex type probe, a "polar-orthogonal coordinate conversion process" is selected. In the case of a 2D phased array type 3D probe, an "orthogonal-orthogonal coordinate conversion process" is selected.

Next, the three-dimensional processing module 54 selects the interpolation algorithm of the three-dimensional DSC process, according to the data size that forms the volume rate and the volume (S603). As the criteria for selecting the interpolation algorithm, the processing time of the interpolation algorithm which is a selection candidate is shorter than the volume acquisition cycle of the signal processing unit 11, and the CPU occupancy of the overall control unit 32 is considered. Then, the interpolation algorithm of the highest image quality is selected among the interpolation algorithms which fulfill such selection conditions as described above. As the interpolation algorithm, there are the nearest neighbor interpolating method, a linear interpolating method and an upsampling filter method. However, other interpolating methods can be used, as well.

Then, by using the selected and determined coordinate conversion algorithm, volume size and interpolation algorithm, the three-dimensional DSC process is performed and the volume data is generated (S604a, S604b or S604c).

Next, the three-dimensional processing module 54 decides the sample pitch of the volume rendering, according to the volume rate and the volume size (S605). The sample pitch is closely related to the rendering processing time and the image quality. By making the sample pitch big, the processing time can be shortened, but the image quality is deteriorated.

As the criteria for selecting the sample pitch, the rendering processing time in the sample pitch that is a selection candidate is shorter than the volume acquisition cycle of the signal processing unit 11, and the CPU occupancy of the overall control unit 32 is considered. The smallest value is selected among the sample pitches that fulfill such selection conditions as described above.

Next, the three-dimensional processing module 54 selects the interpolation algorithm of the sample value of the volume rendering, according to the volume rate and the volume size (S606). The selection of the interpolation algorithm is the same as the three-dimensional DSC process, thus the explanation will be omitted here.

Next, the rendering algorithm is decided by the 3D display mode (S607). As the rendering algorithm, there are a ray casting rendering method and a Maximum/Minimum Intensity Projection (MIP) rendering method. However, the rendering algorithm is not limited to such methods as described above, and other rendering methods can be used.

Here, the three-dimensional processing module 54 changes the operation of the algorithm, according to the volume rate and volume size. For example, in the volume rendering, as a technique to improve the quality of the three-dimensional image to be generated, there are a diffuse reflection shading and a depth shading. However, if such shadings as described above are applied, the burden of the process increases. Thus, the three-dimensional processing module 54 makes the rendering processing time shorter than the volume acquisition cycle of the signal processing unit 11, and considers the CPU occupancy of the overall control unit 32. And, the three-dimensional processing module 54 selects the applicable technique within these restrictions.

Next, the three-dimensional processing module 54 performs the volume rendering by the sample pitch, the interpolation algorithm and the rendering algorithm selected and determined as described above, and generates three-dimensional image data (5608).

Finally, the three-dimensional processing module 54 transmits the generated three-dimensional image data to the two-dimensional drawing module 55 (S609). Thus, while the diagnosis by the "3D live mode" continues, such processes as described above are repeated (S601-S610).

Also, as the two-dimensional DSC process and the three-dimensional DSC process include many common processes, the modules can be shared. Such mutual modules can be easily implemented because of the flexibility of the software. And, the waste that the equal functional blocks are redundantly implemented can be avoided.

Moreover, a structure that generates and displays a cross-sectional image, instead of a three-dimensional image, by slicing volume data by a predetermined plate can be used, as well. In this case, the sample pitch and the interpolation algorithm of the sample value for generating a cross-sectional image can be decided, according to the volume rate, as well. However, the specific explanations will be omitted here.

Here, in consideration with the communication of the ultrasonic echo via the probe, in order to scan single frame data forming a part of volume, as described in the first embodiment, it takes time corresponding to the depth, width and density in scanning the subject. Then, in the case of the 3D probe mechanically swaying the sector convex type probe, the time the probe takes for single sway is decided by the swaying degree and the swaying rate. And, scanning of frames continues during the time the probe takes for single sway. Thus, the frame data group is made by such scanning of frames for forming a volume.

When the above is taken into consideration, it is possible that the acquisition rate (volume rate) and the acquisition amount (data size for forming a volume) of the acoustic line data forming a volume that is outputted from the signal processing unit 11 depend on (i) the depth, width and density in scanning the subject, (ii) the swaying degree of the probe and (iii) the swaying rate of the probe. Moreover, it can be considered that the following steps depend on (i) the depth, width and density in scanning the subject, (ii) the swaying degree of the probe and (iii) the swaying rate of the probe: selection of the interpolation algorithm for the three-dimensional DSC process (S603), determining the sample pitch for the volume rendering (S605), selection of the interpolation algorithm (S606) and selection of the rendering algorithm (S607).

(Multi Planner Reconstruction (MPR) Mode)

In the case of transiting to the "MPR mode", the cine memory 53 holds the volume data generated in the "3D live mode".

The three-dimensional processing module 54 is performed in the case where the three-dimensional image and the cross-sectional image need to be renewed such as the case where the mode is transited to the "MPR mode", and the radial direction for observing the volume data and the cut surface are changed by a user's operation.

First, the three-dimensional processing module 54 reads volume data from the cine memory 53, via the cine memory control module 52, and generates three-dimensional image data (two-dimensional image data describing a volume) and a cross-sectional image by the volume rendering process. And, the three-dimensional processing module 54 transmits them to the two-dimensional drawing module 55.

Also, the two-dimensional drawing module 55 is periodically activated, and performs a two-dimensional DSC process for the three-dimensional image data or the cross-sectional image data. And, the two-dimensional drawing module 55 converts them to display data, and transmits the display data to the display unit 14.

Finally, the display unit 14 displays the three-dimensional image data and the cross-sectional image data in the display.

In the "MPR mode", either of the image quality of the three-dimensional image and the cross-sectional image or the renewal response is prioritized. And, the sample pitch for the volume rendering and generating the cross-sectional image is determined. Then, the interpolation algorithm of the sample value is selected; and the rendering algorithm is changed.

Finally, the method of the cine memory control module 52 to reserve the area for the cine memory 53 in the host memory 13 will be explained.

In the "3D live mode", the cine memory 53 is reserved and controlled by dividing into the area for memorizing the acoustic line data of the tomographic image information and the area for holding the volume data. On the other hand, in the "MPR mode", the cine memory 53 is reserved and controlled by dividing into the area for holding the volume data and the work area used for cutting off a part of volume data. Thus, the cine memory control module 52 performs the optimum memory control according to the operational mode.

As described above, by using the ultrasonic diagnostic apparatus according to the second embodiment, (a) the algorithm of the interpolating process in the three-dimensional DSC process and (b) the algorithm of the rendering and the interpolating process in the volume rendering can be flexibly changed. Therefore, the image of as a high picture quality as the resource permits can be acquired by efficiently utilizing the resource.

As well as the first embodiment, by dynamically reserving the cine memory area, the host memory area can be efficiently utilized. Thus, the cost of the system can be reduced.

Although in both the first and second embodiments, as the most suitable structure where the present invention exhibits its effects, the structure which implements each function of the backend unit 15 as a software operated by the overall control unit 12 is described, the present invention is not limited to such structure as described above.

For example, in the case where the two-dimensional DSC processing unit is implemented by a hardware, the throughput of the process may be different, due to the difference of the interpolation algorithm, depending on the implementation. In this case, the present invention can be applied.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The ultrasonic diagnostic apparatus and the method according to the present invention are beneficial as the ultrasonic diagnostic apparatus and the like capable of flexibly and easily dealing with the diversification of the function of the backend unit of the ultrasonic diagnostic apparatus. Also, such ultrasonic diagnostic apparatus and method as described above are suitable for the ultrasonic diagnostic apparatus and the like capable of inspecting not only human bodies but also animals and goods without any invasion and destruction.

What is claimed is:

1. An ultrasonic diagnostic apparatus comprising:
an acoustic line data generation unit operable to generate acoustic line data based on echo signals acquired via a probe;
a display data generation unit operable to generate display data for the generated acoustic line data; and
a display unit operable to display an image describing an inner state of a subject based on the generated display data,
wherein the display data generation unit includes interpolation algorithms of different processing loads, and is operable to (i) select one of the interpolation algorithms so that a processing rate of the interpolation algorithm, at which the display data is generated from the acoustic line data, is equal to or above an acquisition rate of the acoustic line data generated by the acoustic line data generation unit or is equal to or above a renewal rate of the display data of the image, and to (ii) perform a process for generating the display data using the selected interpolation algorithm, so as to change the quality of the image describing the inner state of the subject and to generate the display data of the changed quality.

2. The ultrasonic diagnostic apparatus according to claim 1,
wherein in the case where the image describing the inner state of the subject is a three-dimensional description image of an object described by volume data for a tomographic image or a blood flow image or in the case where the image is a cross-sectional image of the subject, the display data generation unit includes, as the interpolation algorithms, interpolation algorithms for sampling a voxel value, and is operable to (i) acquire the voxel value by sampling the volume data acquired from the acoustic line data, and to (ii) select one of the interpolation algorithms for the sampling processing so that the processing rate of the voxel value is equal to or above the acquisition rate of the volume data, so as to generate the display data using the voxel value.

3. The ultrasonic diagnostic apparatus according to claim 2,
wherein the display data generation unit is operable to adaptively set a sample pitch for acquiring the voxel value so that the processing rate of the voxel value is equal to or above the acquisition rate of the volume data.

4. The ultrasonic diagnostic apparatus according to claim 1,
wherein in the case where the image describing the inner state of the subject is a three-dimensional description image of an object described by volume data for a tomographic image or a blood flow image, the display data generation unit includes, as the interpolation algorithm, interpolation algorithms for a three-dimensional coordinate conversion process, and is operable to (i) acquire a voxel value by sampling the volume data acquired from the acoustic line data, and to (ii) select one of the interpolation algorithms for the three-dimensional coordinate conversion process so that the processing rate of the voxel value is equal to or above the acquisition rate of the volume data, so as to generate the display data using the voxel value.

5. The ultrasonic diagnostic apparatus according to claim 4,
wherein the display data generation unit further includes rendering algorithms for generating the display data of the three-dimensional description image using the voxel value, and is operable to select one of the rendering algorithms so that the processing rate of the voxel value is equal to or above the acquisition rate of the volume data or is equal to or above the renewal rate of the display data of the image.

6. The ultrasonic diagnostic apparatus according to claim 1,
wherein in the case where the image describing the inner state of the subject is one of: a tomographic image or a blood flow image; a time displacement image of the tomographic image or the blood flow image in a same acoustic line position; and a Doppler spectrum image, the display data generation unit includes, as the interpolation algorithms, interpolation algorithms for a two-dimensional coordinate conversion process.

7. The ultrasonic diagnostic apparatus according to claim 1,
wherein the display data generation unit is operable to select an interpolation algorithm having a heaviest processing load from among the interpolation algorithms so that the processing rate of the interpolation algorithm is equal to or above the acquisition rate of the acoustic line data or the renewal rate of the display data.

8. The ultrasonic diagnostic apparatus according to claim 1,
wherein the display data generation unit is operable to change the selected interpolation algorithm to another interpolation algorithm which allows generating an image of higher quality, from the interpolation algorithms so that the processing rate of the interpolation algorithm is equal to or above the acquisition rate of the acoustic line data or the renewal rate of the display data.

* * * * *